United States Patent
Sun et al.

(10) Patent No.: US 12,487,989 B2
(45) Date of Patent: Dec. 2, 2025

(54) DISTRIBUTED DATABASE SYSTEM AND DATA PROCESSING METHOD

(71) Applicant: Alibaba Group Holding Limited, Grand Cayman (KY)

(72) Inventors: Mengshi Sun, Hangzhou (CN); Jianghang Lou, Hangzhou (CN); Yu Fu, Hangzhou (CN); Xueqiang Wu, Hangzhou (CN)

(73) Assignee: Alibaba Group Holding Limited, Grand Cayman (KY)

( * ) Notice: Subject to any disclaimer, the term of this patent is extended or adjusted under 35 U.S.C. 154(b) by 50 days.

(21) Appl. No.: 18/101,049

(22) Filed: Jan. 24, 2023

(65) Prior Publication Data

US 2023/0161758 A1 May 25, 2023

Related U.S. Application Data

(63) Continuation of application No. PCT/CN2021/107243, filed on Jul. 20, 2021.

(30) Foreign Application Priority Data

Jul. 24, 2020 (CN) .......................... 202010721315.0

(51) Int. Cl.
  *G06F 16/23* (2019.01)
  *G06F 9/46* (2006.01)
  *G06F 16/27* (2019.01)
(52) U.S. Cl.
  CPC .......... *G06F 16/2379* (2019.01); *G06F 9/466* (2013.01); *G06F 16/27* (2019.01)
(58) Field of Classification Search
  CPC .................................................. G06F 16/2379
  See application file for complete search history.

(56) References Cited

U.S. PATENT DOCUMENTS 9,928,264 B2 * 3/2018 Lomet ................. G06F 16/2255
9,984,140 B1 * 5/2018 Sukumaran ............. G06F 16/27
(Continued)

FOREIGN PATENT DOCUMENTS

CN  102037463 A  4/2011
CN  106991113 A  7/2017
(Continued)

OTHER PUBLICATIONS

English Translation of PCT International Search Report for PCT Application No. PCT/CN2021/107243 dated Oct. 18, 2021, 2 pages.
(Continued)

*Primary Examiner* — Mohammad S Rostami
(74) *Attorney, Agent, or Firm* — Lee & Hayes, P.C.

(57) ABSTRACT

A distributed database system includes: a computing module configured to receive a transaction starting request; determine a target transaction and a target storage module corresponding to the target transaction based on the transaction starting request; send an execution instruction to a target storage module; send a commit instruction to the target storage module when the target storage module returns a message that the target transaction is executed successfully, the commit instruction including a commit timestamp of the target transaction; and the target storage module configured to receive the execution instruction, and execute the target transaction according to the execution instruction; return the message that the target transaction is successfully executed to the computing module when the target transaction is successfully executed; and receive the commit instruction, commit the target transaction according to the commit instruction, and generate a binary log according to the commit timestamp of the target transaction.

20 Claims, 11 Drawing Sheets

(56) References Cited

U.S. PATENT DOCUMENTS

| | | | |
|---|---|---|---|
| 10,235,440 B2 | 3/2019 | Lee et al. | |
| 10,268,743 B2 | 4/2019 | Lee et al. | |
| 10,346,430 B2 | 7/2019 | Horowitz et al. | |
| 10,474,695 B1* | 11/2019 | Holenstein | G06F 11/2097 |
| 10,496,669 B2 | 12/2019 | Merriman et al. | |
| 11,966,411 B1* | 4/2024 | Rajgaria | G06F 16/254 |
| 2010/0191884 A1* | 7/2010 | Holenstein | G06F 16/2343 |
| | | | 707/613 |
| 2012/0030172 A1* | 2/2012 | Pareek | G06F 16/275 |
| | | | 707/635 |
| 2012/0041988 A1* | 2/2012 | Driesen | G06F 16/213 |
| | | | 707/E17.127 |
| 2016/0321145 A1* | 11/2016 | Fang | G06F 11/1451 |
| 2016/0371356 A1* | 12/2016 | Lee | G06F 16/273 |
| 2018/0137187 A1* | 5/2018 | Brodt | G06F 16/275 |
| 2018/0300146 A1* | 10/2018 | Wang | G06F 16/2308 |
| 2018/0300147 A1* | 10/2018 | Wang | G06F 16/2358 |
| 2018/0322156 A1* | 11/2018 | Lee | G06F 16/23 |
| 2019/0129894 A1* | 5/2019 | Peng | G06F 12/08 |
| 2019/0332582 A1* | 10/2019 | Kumar | G06F 16/254 |
| 2019/0347348 A1* | 11/2019 | Park | G06F 16/2365 |
| 2019/0361895 A1 | 11/2019 | Weaver et al. | |
| 2020/0210395 A1* | 7/2020 | Molini | G06F 16/219 |
| 2021/0073338 A1* | 3/2021 | Dounis | G06N 3/006 |
| 2021/0218745 A1* | 7/2021 | Firnkorn | H04L 9/3239 |
| 2022/0004542 A1* | 1/2022 | Han | G06F 16/27 |

FOREIGN PATENT DOCUMENTS

| | | |
|---|---|---|
| CN | 110018884 A | 7/2019 |
| CN | 110019112 A | 7/2019 |
| CN | 110196760 A | 9/2019 |
| CN | 110457157 A | 11/2019 |
| CN | 111427966 A | 7/2020 |
| WO | WO2016064575 A1 | 4/2016 |
| WO | 2019037617 A1 | 2/2019 |
| WO | WO2019154394 A1 | 8/2019 |

OTHER PUBLICATIONS

English Translation of PCT Written Opinion for PCT Application No. PCT/CN2021/107243 dated Oct. 18, 2021, 4 pages.
English Translation of CN First Office Action and Search Report for CN Application No. 202010721315.0 dated Jul. 29, 2023, 10 pages.

* cited by examiner

DISTRIBUTED DATABASE SYSTEM AND DATA PROCESSING METHOD

CROSS REFERENCE TO RELATED PATENT APPLICATIONS

This application claims priority to and is a continuation of PCT Patent Application No. PCT/CN2021/107243 filed on 20 Jul. 2021, and is related to and claims priority to Chinese Application No. 202010721315.0, filed on 24 Jul. 2020 and entitled "Distributed Database System and Data Processing Method," which are incorporated herein by reference in their entirety.

TECHNICAL FIELD

The present disclosure relates to the field of database technology, and in particular, to distributed database systems. The present disclosure also relates to data processing methods, computing devices, and computer-readable storage media.

BACKGROUND

With the increasing development of computer technology, in order to meet the increasing needs of users, distributed databases emerge. A distributed database includes multiple storage nodes. In each storage node, each DML (Data Manipulation Language) write operation will independently generate a binary log (binlog). These binary logs are kept in order in the respective storage node where they are located. However, in a distributed database, two successive operations may occur on two different storage nodes, and directly subscribe to binary logs of these two storage nodes, which may lead to an occurrence of incorrect ordering of the two operations, and eventually an occurrence of inconsistent data.

SUMMARY

This Summary is provided to introduce a selection of concepts in a simplified form that are further described below in the Detailed Description. This Summary is not intended to identify all key features or essential features of the claimed subject matter, nor is it intended to be used alone as an aid in determining the scope of the claimed subject matter. The term "techniques," for instance, may refer to device(s), system(s), method(s) and/or processor-readable/computer-readable instructions as permitted by the context above and throughout the present disclosure.

In view of this, embodiments of the present disclosure provide a distributed database system. The present disclosure also relates to a data processing method, a computing device, and a computer-readable storage medium, so as to solve technical defects in existing technologies.

According to the first aspect of the embodiments of the present disclosure, a distributed database system is provided, and includes: a computing module and storage modules.

The computing module is configured to receive a transaction starting request; determine a target transaction and a target storage module corresponding to the target transaction based on the transaction starting request; send an execution instruction to the target storage module, and the execution instruction including the target transaction to be executed; send a commit instruction to the target storage module when the target storage module returns a message that the target transaction is executed successfully, the commit instruction including the target transaction to be committed and a commit timestamp of the target transaction.

The target storage module is configured to receive the execution instruction, and execute the target transaction according to the execution instruction; return the message that the target transaction is successfully executed to the computing module when the target transaction is successfully executed; and receive the commit instruction, commit the target transaction according to the commit instruction, and generate a binary log according to the commit timestamp of the target transaction.

In implementations, the system further includes: a plurality of execution modules and an ordering module, each execution module in the plurality of execution modules corresponding to a storage module.

The execution module is configured to read binary logs of a corresponding storage module, and generate a memory sequence according to the binary logs.

The ordering module is configured to read a respective memory sequence of each execution module, and obtain a commit timestamps of a target transaction in each binary log in the memory sequence; according to the commit timestamp of the target transaction, order the binary logs in the memory sequence; write the ordered binary logs into a message queue.

In implementations, the computing module is further configured to:
  determine an execution logic of a form processing event if the form processing event is detected;
  generate a timestamp of the form processing event according to the execution logic; and
  generate a binary log of the form processing event based on the timestamp.

In implementations, the computing module is further configured to:
  determine an operation type of the form processing event;
  determine a compatibility type corresponding to the form processing event based on the operation type; and
  determine the execution logic of the form processing event based on the compatibility type.

In implementations, the computing module is further configured to:
  if the operation type belongs to a first type, determine that the compatibility type corresponding to the form processing event is that a first version is compatible with a second version, the first version being a version before an execution of the form processing event, and the second version being a version after the execution of the form processing event; and
  if the operation type belongs to a second type, determine that the compatibility type corresponding to the form processing event is that the second version is compatible with the first version.

In implementations, the computing module is further configured to:
  if the compatibility type corresponding to the form processing event is that the first version is compatible with the second version, determine that the execution logic of the form processing event is a post-order execution; and
  if the compatibility type corresponding to the form processing event is that the second version is compatible with the first version, determine that the execution logic of the form processing event is a pre-order execution.

In implementations, the computing module is further configured to:
if the execution logic of the form processing event is the pre-order execution, obtain the timestamp of the form processing event before binary logs corresponding to all data of the second version are generated; and
if the execution logic of the form processing event is the post-order execution, obtain the timestamp of the form processing event after binary logs corresponding to all data of the first version are generated.

In implementations, the ordering module is further configured to:
insert the binary logs of the form processing event into the message queue according to the timestamp of the form processing event.

In implementations, the system also includes a timestamp generator, and the computing module is further configured to:
apply to the timestamp generator for a globally ordered timestamp; and
determine the timestamp as the commit timestamp of the target transaction.

In implementations, the transaction starting request includes a transaction identification and a corresponding storage module identification, and the computing module is further configured to:
determine a transaction indicated by the transaction identification as the target transaction; and
determine a storage module indicated by the storage module identification as the corresponding target storage module.

In implementations, the transaction starting request includes a transaction identification, and the computing module is further configured to:
determine a transaction indicated by the transaction identification as the target transaction; and
determine the target storage module corresponding to the target transaction according to a preset allocation rule.

In implementations, the execution module is further configured to:
return to perform the operation step of reading the binary logs of the storage module if determining that the storage module corresponding thereto generates a new binary log.

Correspondingly, the ordering module is further configured to:
return to perform the operation step of reading the memory sequence of each execution module; or,
obtain a binary log added in the execution module, and put the binary log at a tail of the message queue.

In implementations, the computing module is further configured to:
record a storage module identification of the target storage module.

In implementations, the computing module is further configured to:
send a target transaction starting request to the target storage module; and
execute the operation step of sending the execution instruction to the target storage module when the target storage module returns a start message.

In implementations, the storage module is further configured to:
generate a binary log, and record the commit timestamp of the target transaction in a comment of the binary log.

According to the second aspect of the embodiments of the present disclosure, a data processing method is provided, which is applied to the computing module in the distributed database system provided by the first aspect above. The method includes:
receiving a transaction starting request;
determining a target transaction and a target storage module corresponding to the target transaction based on the transaction starting request;
sending an execution instruction to the target storage module, the execution instruction including the target transaction to be executed;
sending a commit instruction to the target storage module when the target storage module returns a message that the target transaction is executed successfully, the commit instruction including the target transaction to be committed and a commit timestamp of the target transaction.

In implementations, the method further includes:
determining an execution logic of a form processing event if the form processing event is detected;
generating a timestamp of the form processing event according to the execution logic; and
generating a binary log of the form processing event based on the timestamp.

In implementations, determining the execution logic of the form processing event includes:
determining an operation type of the form processing event;
determining a compatibility type corresponding to the form processing event according to the operation type; and
determining the execution logic of the form processing event according to the compatibility type.

In implementations, determining the compatibility type corresponding to the form processing event according to the operation type includes:
if the operation type belongs to a first type, determine that the compatibility type corresponding to the form processing event is that a first version is compatible with a second version, the first version being a version before an execution of the form processing event, and the second version being a version after the execution of the form processing event; and if the operation type belongs to a second type, determine that the compatibility type corresponding to the form processing event is that the second version is compatible with the first version.

In implementations, determining the execution logic of the form processing event according to the compatibility type includes:
if the compatibility type corresponding to the form processing event is that the first version is compatible with the second version, determine that the execution logic of the form processing event is a post-order execution;
if the compatibility type corresponding to the form processing event is that the second version is compatible with the first version, determine that the execution logic of the form processing event is a pre-order execution.

In implementations, generating the timestamp of the form processing event according to the execution logic includes:
if the execution logic of the form processing event is the pre-order execution, obtain the timestamp of the form processing event before binary logs corresponding to all data of the second version are generated; and
if the execution logic of the form processing event is the post-order execution, obtain the timestamp of the form processing event after binary logs corresponding to all data of the first version are generated.

In implementations, before sending the commit instruction to the target storage module, the method further includes:
  applying to a timestamp generator for a globally ordered timestamp; and
  determining the timestamp as the commit timestamp of the target transaction.

In implementations, the transaction starting request includes a transaction identification and a corresponding storage module identification, and determining the target transaction and the target storage module corresponding to the target transaction based on the transaction starting request includes:
  determining a transaction indicated by the transaction identification as the target transaction; and
  determining a storage module indicated by the storage module identification as the corresponding target storage module.

In implementations, the transaction starting request includes a transaction identification, and determining the target transaction and the target storage module corresponding to the target transaction based on the transaction starting request includes:
  determining a transaction indicated by the transaction identification as the target transaction; and
  determining a target storage module corresponding to the target transaction according to a preset allocation rule.

In implementations, after sending the execution instruction to the target storage module, the method further includes:
  recording a storage module identification of the target storage module.

In implementations, after determining the target transaction and the target storage module corresponding to the target transaction based on the transaction starting request, and before sending the execution instruction to the target storage module, the method further includes:
  sending a target transaction starting request to the target storage module; and
  executing the operation step of sending the execution instruction to the target storage module when the target storage module returns a start message.

According to the third aspect of the embodiments of the present disclosure, a data processing method is provided, which is applied to the storage module in the distributed database system provided in the first aspect above. The method includes:
  after receiving an execution instruction, executing a target transaction according to the execution instruction, the execution instruction including a target transaction to be executed;
  when the target transaction is executed successfully, returning a message that the target transaction is successfully executed to a computing module; and
  receiving a commit instruction, committing the target transaction according to the commit instruction, and generating a binary log according to a commit timestamp of the target transaction, the commit instruction including the target transaction to be committed and the commit timestamp of the target transaction.

In implementations, generating the binary log according to the commit timestamp of the target transaction includes:
  generating a binary log, and recording the commit timestamp of the target transaction in a comment of the binary log.

According to the fourth aspect of the embodiment of the present disclosure, a data processing method is provided, which is applied to the ordering module in the distributed database system provided in the first aspect above. The method includes:
  reading a memory sequence of each execution module;
  obtaining commit timestamps of target transactions in each binary log in the memory sequence;
  ordering binary logs in the memory sequence according to the commit timestamps of the target transactions; and
  writing the ordered binary logs into a message queue.

In implementations, after writing the ordered binary log into the message queue, the method further includes:
  if detecting that the memory sequence of the execution module changes, returning to the operation step of reading the memory sequence of each execution module.

In implementations, after writing the ordered binary log into the message queue, the method further includes:
  if detecting that the memory sequence of the execution module changes, obtaining a binary log added in the execution module, and placing the binary log into a tail of the message queue.

In implementations, after writing the ordered binary log into the message queue, the method further includes:
  inserting a binary log of a form processing event into the message queue according to a timestamp of the form processing event.

According to the fifth aspect of the embodiments of the present disclosure, a computing device is provided, and includes:
  a memory and a processor;
  the memory configured to store computer-executable instructions, and the processor configured to execute the computer-executable instructions:
  receiving a transaction starting request;
  determining a target transaction and a target storage module corresponding to the target transaction according to the transaction starting request;
  sending an execution instruction to the target storage module, the execution instruction including a target transaction to be executed; and
  when the target storage module returns a message that the target transaction is executed successfully, sending a commit instruction to the target storage module, the commit instruction including a target transaction to be committed and a commit timestamp of the target transaction.

According to the sixth aspect of the embodiments of the present disclosure, a computing device is provided, and includes:
  a memory and a processor;
  the memory configured to store computer-executable instructions, and the processor configured to execute the computer-executable instructions:
  after receiving an execution instruction, executing a target transaction according to the execution instruction, the execution instruction including a target transaction to be executed;
  when the target transaction is executed successfully, returning a message that the target transaction is successfully executed to a computing module; and
  receiving a commit instruction, committing the target transaction according to the commit instruction, and generating a binary log according to a commit timestamp of the target transaction, the commit instruction including the target transaction to be committed and the commit timestamp of the target transaction.

According to the seventh aspect of the embodiments of the present disclosure, a computing device is provided, and includes:

a memory and a processor;

the memory configured to store computer-executable instructions, and the processor configured to execute the computer-executable instructions:

reading a memory sequence of each execution module;

obtaining commit timestamps of target transactions in each binary log in the memory sequence;

ordering binary logs in the memory sequence according to the commit timestamps of the target transactions; and writing the ordered binary logs into a message queue.

According to the eighth aspect of the embodiments of the present disclosure, a computer-readable storage medium is provided, which stores computer-executable instructions, and when the instructions are executed by a processor, the steps of any of the data processing methods described in the second aspect above are implemented.

According to the ninth aspect of the embodiments of the present disclosure, a computer-readable storage medium is provided, which stores computer-executable instructions, and when the instructions are executed by a processor, the steps of any of the data processing methods described in the third aspect above are implemented.

According to the tenth aspect of the embodiments of the present disclosure, a computer-readable storage medium is provided, which stores computer-executable instructions, and when the instructions are executed by a processor, the steps of any of the data processing methods described in the fourth aspect above are implemented.

A distributed database system provided in the present disclosure includes a computing module and a storage module. The computing module is configured to receive a transaction starting request; determine a target transaction and a target storage module corresponding to the target transaction according to the transaction starting request; send an execution command to the target storage module; and sends a commit command to the target storage module when the target storage module returns a message that the target transaction is executed successfully, the commit command including a target transaction to be committed and a commit timestamp of the target transaction. The target storage module is configured to receive the execution instruction, execute the target transaction according to the execution instruction; return the message that the target transaction is successfully executed to the computing module when the target transaction is successfully executed; and receive the commit instruction, commit the target transaction according to the commit instruction, and generate a binary log according to the commit timestamp of the target transaction. In this way, each storage module generates a binary log according to a commit timestamp of a target transaction sent by the computing module. Each binary log includes a globally ordered timestamp, so that two operations before and after a time point in the distributed database system can be arranged in order, avoiding an occurrence of incorrect ordering of the operations.

DETAILED DESCRIPTION

Figure 1:
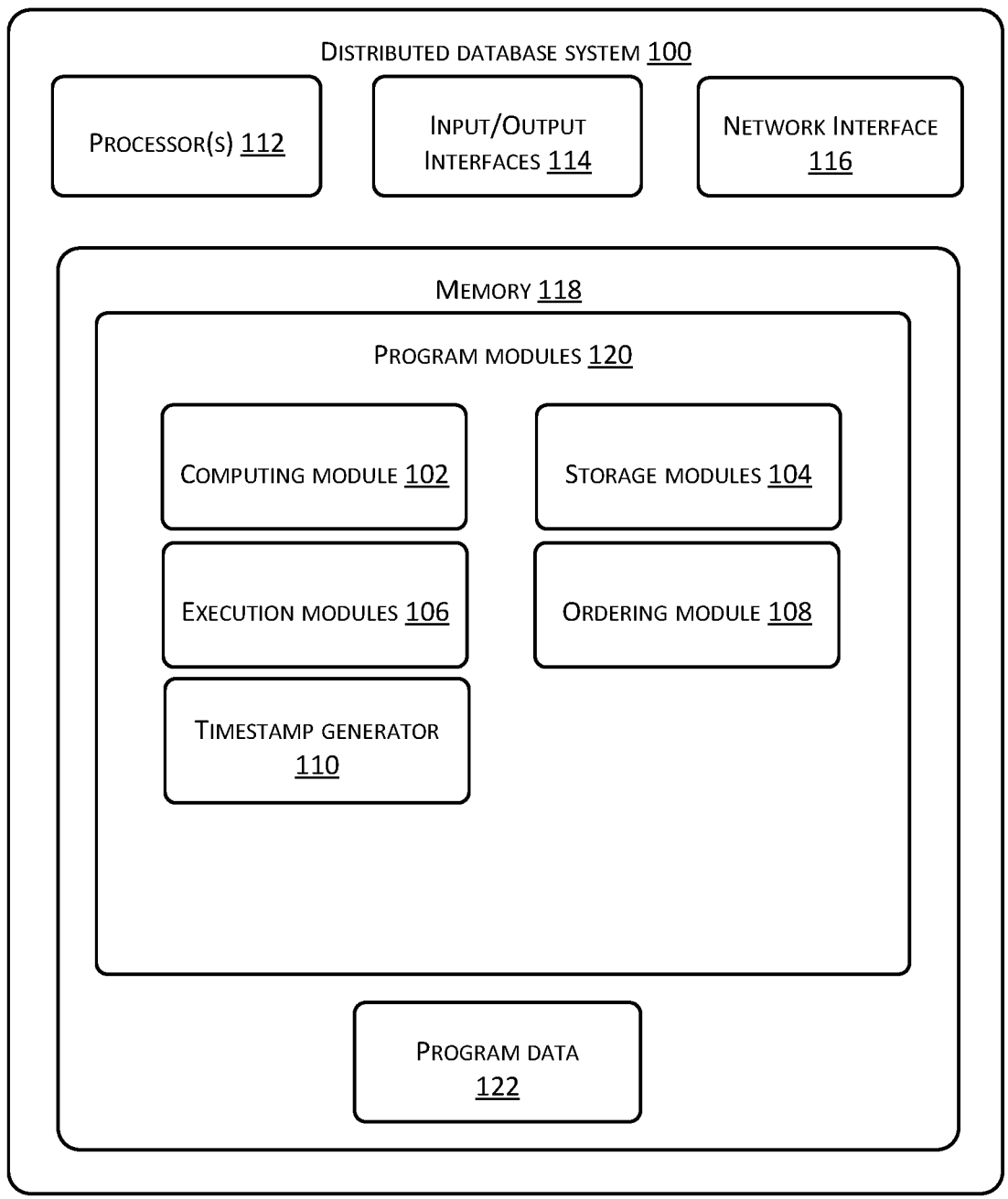
FIG. 1 is a structural block diagram of a distributed database system provided by an embodiment of the present disclosure.

In the following description, a number of specific details are set forth in order to provide a thorough understanding of the specification. However, the present disclosure can be implemented in many other ways different from those described herein. One skilled in the art can make similar extensions without violating the connotation of the present disclosure. Therefore, the present disclosure is not limited by specific implementations described below.

Terms used in one or more embodiments of the present disclosure are intended for describing specific embodiments only, and are not intended to limit one or more embodiments of the present disclosure. As used in one or more embodiments of the present disclosure and the appended claims, singular forms "a", "said", and "the" are also intended to include a plural form unless the context clearly dictates otherwise. It should also be understood that the term "and/or" used in one or more embodiments of the present disclosure refers to and includes any or all possible combinations of one or more associated listed items.

It should be understood that although terms such as "first", "second", etc., may be used to describe various types of information in one or more embodiments of the present disclosure, these pieces of information should not be limited to these terms. These terms are only used to distinguish information of the same type from one another. For example, the first may also be referred to as the second, and similarly, the second may also be referred to as the first without departing from the scope of one or more embodiments of the present disclosure. Depending on the context, the word "if" as used herein may be interpreted as "at the time when" or "when" or "in response to a determination".

First, nouns and terms involved in one or more embodiments of the present disclosure are explained.

SQL (Structured Query Language) is a special-purpose programming language, a database query and programming language, and is used to access data and query, update and manage relational database systems. SQL is an advanced non-procedural programming language that allows users to work on high-level data structures. It does not require users to specify a storage method for data, nor does it require users to understand a specific data storage method. Therefore, different database systems with completely different underlying structures can use the same SQL as an interface for data input and management. SQL can be nested, which enables it to have great flexibility and powerful functions. The SQL language includes statements in four major programming language categories: Data Definition Language (DDL), Data Manipulation Language (DML), Data Control Language (DCL), and Transaction Control Language (TCL), in which statements such as adding, deleting, modifying, etc., in the data manipulation language (DML), and statements such as adding columns, changing column types, lengths, adding constraints, etc., in the data definition language (DDL).

Transaction is a basic unit of recovery and concurrency control, and is an execution unit composed of multiple SQL statements, having four characteristics: atomicity, consistency, isolation, and durability. Atomicity means that a transaction is an indivisible unit of work, and operations included in the transaction are either all done or not done. Consistency means that a transaction must change a database from one consistent state to another consistent state. Consistency and atomicity are closely related. Isolation means that an execution of a transaction cannot be interfered by other transactions, that is, operations and data used within a transaction are isolated from other concurrent transactions, and transactions executed concurrently cannot interfere with each other. Durability, which is also known as permanence, means that once a transaction is committed, its changes to data in a database should be permanent, and other subsequent operations or failures should not have any impact on it.

MySQL is a relational database management system. As MySQL continues to mature, it is gradually used in more large-scale websites and applications.

PolarDB is a new generation of relational cloud-native database. It not only has the low-cost advantages of a distributed design, but also has the ease of centralized use. It realizes a separation of computing modules and storage modules, and provides immediate scalability and operation and maintenance capabilities, software and hardware integrated design, to meet the needs of large-scale application scenarios.

PolarDB-X is a distributed version of PolarDB, a distributed database based on MySQL sharding (database sharding), and mainly composed of a storage module (MySQL server) and a computing module.

TSO is a centralized timestamp generator that provides globally ordered timestamp services.

Binlog is a log file in binary format, which is used to record changes to a database inside Mysql (only recording operations of modification to data), and is mainly used for master-slave replication and incremental recovery of the database. MySQL officially supports three binlog data formats, with a corresponding parameter as binlog_format, selectable values as ROW, STATEMENT, MIXED, and a corresponding default value as MIXED, which needs to be adjusted to a ROW mode. The characteristics of this mode are: for each SQL involving addition, deletion or modification, values of rows affected by SQL before and after a change are recorded in the binlog. In MySQL, each DML (writing such as addition, deletion, modification, etc., which includes DDL) operation will generate a binlog (binary log) log. This log is ordered according to an operation time in MySQL. Downstream applications can perform some subscription operations based on this log (e.g., data synchronization).

Physical binlog is a binlog of each storage module of PolarDB-X.

Logical binlog is a binlog provided by a PolarDB-X layer, which includes binlogs of all storage modules, and is presented externally as a kafka message queue.

Commit instruction is a commit command, which is used to save modifications(s) made by a transaction to a database.

Commit_timestamp is used to mark a commit time of a transaction, and is abbreviated as commit_ts.

Jingwei worker is a module that executes work, which has a one-to-one correspondence with a storage module, being responsible for reading a binlog file of the corresponding storage module, and responsible for performing parsing, and generating a memory sequence for a parsed result.

Jingwei merger is equivalent to a merging and ordering module, which merges multiple ordered queues into a global ordered queue.

The basic concept of the present disclosure is described hereinafter:

Currently, in a distributed database, each storage node will generate a binary log independently after executing a transaction (DML-related operations). The binary log generated by each storage node is kept in order within the storage node. However, a chronological order of binary logs generated by different storage nodes is uncertain. Therefore, in a distributed database, two operations before and after the time may occur on two different storage nodes, and downstream applications directly subscribe to the binary logs of the two storage nodes, which may cause the order of these two operations to be out of order, thereby resulting in inconsistencies in final data of the downstream applications.

For example, a distributed database system includes MySQL1, MySQL2, and MySQL3. Two binary logs are generated in MySQL1: log A1 and log A2. Three binary logs are generated in MySQL2: log B1, log B2, and log B3. MySQL3 generates two binary logs: log C1 and log C2. In existing technologies, it can only be determined that log A1 is earlier than log A2, log B1 is earlier than log B2 which is earlier than log B3, and log C1 is earlier than log C2. However, a chronological order of log A1, log A2, log B1, log B2, log B3, log C1, and log C2 is uncertain, and there may be confusion, resulting in differences in data subscribed by downstream applications.

The present disclosure provides a distributed database system, including a computing module and a storage module (such as MySQL). The computing module controls the storage module to execute a target transaction. After the execution is successful, the storage module returns a success message to the computing module. At this time, the computing module sends a commit timestamp of the target transaction to the storage module, so that the storage module generates a binary log according to the timestamp. In this case, the commit timestamp of the globally ordered target transaction is recorded in the binary log, so that all binary logs in the distributed database system are in chronological order, thereby avoiding confusion in the order of transaction operations and ensuring the consistency of subscription data for downstream applications.

In the present disclosure, a distributed database system is provided. The present disclosure also relates to a data processing method, a computing device, and a computer-readable storage medium, which will be described in detail in the following embodiments.

FIG. 1 shows a structural block diagram of a distributed database system 100 provided according to an embodiment of the present disclosure, which in implementations includes a computing module 102 and storage modules 104.

The computing module 102 is configured to receive a transaction starting request; determine a target transaction and a target storage module 104 corresponding to the target transaction according to the transaction starting request; send an execution instruction to the target storage module 104, the execution instruction including a target transaction to be executed; and send a commit instruction to the target storage module 104 when the target storage module 104 returns a message that the target transaction is executed successfully, the commit instruction including a target transaction to be committed and a commit timestamp of the target transaction.

The target storage module 104 is configured to receive the execution instruction, and execute the target transaction according to the execution instruction; return the message that the target transaction is successfully executed to the computing module 102 when the target transaction is successfully executed; and receive the commit instruction, commit the target transaction according to the commit instruction, and generate a binary log according to the commit timestamp of the target transaction.

In implementations, the system 100 may further include: a plurality of execution modules 106 and an ordering module 108. Each execution module 106 in the plurality of execution modules corresponds to a storage module 104.

The execution module 106 is configured to read binary logs of the storage module 104 corresponding thereto, and generate a memory sequence according to the binary logs.

The ordering module 108 is configured to read a memory sequence of each execution module, and obtain a commit timestamp of a target transaction in each binary log in the memory sequence; order the binary logs in the memory sequence according to the commit timestamp of the target transaction; and write the ordered binary logs into a message queue.

In implementations, the computing module 102 is further configured to:
determine an execution logic of a form processing event if the form processing event is detected;
generate a timestamp of the form processing event according to the execution logic; and
generate a binary log of the form processing event based on the timestamp.

In implementations, the computing module is further configured to:
determine an operation type of the form processing event;
determine a compatibility type corresponding to the form processing event based on the operation type; and
determine the execution logic of the form processing event based on the compatibility type.

In implementations, the computing module 102 is further configured to:
if the operation type belongs to a first type, determine that the compatibility type corresponding to the form processing event is that a first version is compatible with a second version, the first version being a version before an execution of the form processing event, and the second version being a version after the execution of the form processing event; and
if the operation type belongs to a second type, determine that the compatibility type corresponding to the form processing event is that the second version is compatible with the first version.

In implementations, the computing module 102 is further configured to:
if the compatibility type corresponding to the form processing event is that the first version is compatible with the second version, determine that the execution logic of the form processing event is a post-order execution; and
if the compatibility type corresponding to the form processing event is that the second version is compatible with the first version, determine that the execution logic of the form processing event is a pre-order execution.

In implementations, the computing module 102 is further configured to:
if the execution logic of the form processing event is the pre-order execution, obtain the timestamp of the form processing event before binary logs corresponding to all data of the second version are generated; and
if the execution logic of the form processing event is the post-order execution, obtain the timestamp of the form processing event after binary logs corresponding to all data of the first version are generated.

In implementations, the ordering module 108 is further configured to:
insert the binary logs of the form processing event into the message queue according to the timestamp of the form processing event.

In implementations, the system 100 further includes a timestamp generator 110, and the computing module 102 is further configured to:
apply to the timestamp generator 110 for a globally ordered timestamp; and
determine the timestamp as the commit timestamp of the target transaction.

In implementations, the transaction starting request includes a transaction identification and a corresponding storage module identification, and the computing module 102 is further configured to:
determine a transaction indicated by the transaction identification as the target transaction; and
determine a storage module 104 indicated by the storage module identification as the corresponding target storage module 104.

In implementations, the transaction starting request includes a transaction identification, and the computing module 102 is further configured to:
determine a transaction indicated by the transaction identification as the target transaction; and
determine the target storage module 104 corresponding to the target transaction according to a preset allocation rule.

In implementations, the execution module 106 is further configured to:
return to perform the operation step of reading the binary logs of the storage module if determining that the storage module 104 corresponding thereto generates a new binary log.

Correspondingly, the ordering module 108 is further configured to:
return to perform the operation step of reading the memory sequence of each execution module; or,
obtain a binary log added in the execution module, and put the binary log at a tail of the message queue.

In implementations, the computing module 102 is further configured to:
record a storage module identification of the target storage module 104.

In implementations, the computing module 102 is further configured to:
send a target transaction starting request to the target storage module 104;

execute the operation step of sending the execution instruction to the target storage module 104 when the target storage module 104 returns a start message.

In implementations, the storage module 104 is further configured to:

generate a binary log, and record the commit timestamp of the target transaction in a comment of the binary log.

In implementations, the system 100 may further include one or more processors 112, an input/output (I/O) interface 114, a network interface 116, and a memory 118. In implementations, the memory 118 may include program modules 120 and program data 122. The program modules 120 may include one or more of the foregoing modules as described in FIG. 1.

In implementations, the memory 118 may include a form of computer readable media such as a volatile memory, a random access memory (RAM) and/or a non-volatile memory, for example, a read-only memory (ROM) or a flash RAM. The memory 118 is an example of a computer readable media.

The computer readable media may include a volatile or non-volatile type, a removable or non-removable media, which may achieve storage of information using any method or technology. The information may include a computer readable instruction, a data structure, a program module or other data. Examples of computer readable media include, but not limited to, phase-change memory (PRAM), static random access memory (SRAM), dynamic random access memory (DRAM), other types of random-access memory (RAM), read-only memory (ROM), electronically erasable programmable read-only memory (EEPROM), quick flash memory or other internal storage technology, compact disk read-only memory (CD-ROM), digital versatile disc (DVD) or other optical storage, magnetic cassette tape, magnetic disk storage or other magnetic storage devices, or any other non-transmission media, which may be used to store information that may be accessed by a computing device. As defined herein, the computer readable media does not include transitory media, such as modulated data signals and carrier waves.

A distributed database system provided in the present disclosure includes a computing module and a storage module. The computing module is configured to receive a transaction starting request; determine a target transaction and a target storage module corresponding to the target transaction according to the transaction starting request; send an execution command to the target storage module; and sends a commit command to the target storage module when the target storage module returns a message that the target transaction is executed successfully, the commit command including a target transaction to be committed and a commit timestamp of the target transaction. The target storage module is configured to receive the execution instruction, execute the target transaction according to the execution instruction; return the message that the target transaction is successfully executed to the computing module when the target transaction is successfully executed; and receive the commit instruction, commit the target transaction according to the commit instruction, and generate a binary log according to the commit timestamp of the target transaction. In this way, each storage module generates a binary log according to a commit timestamp of a target transaction sent by the computing module. Each binary log includes a globally ordered timestamp, so that two operations before and after a time point in the distributed database system can be arranged in order, thereby avoiding an occurrence of incorrect ordering of the operations, and ensuring the consistency of subscription data of downstream applications.

Figure 2:
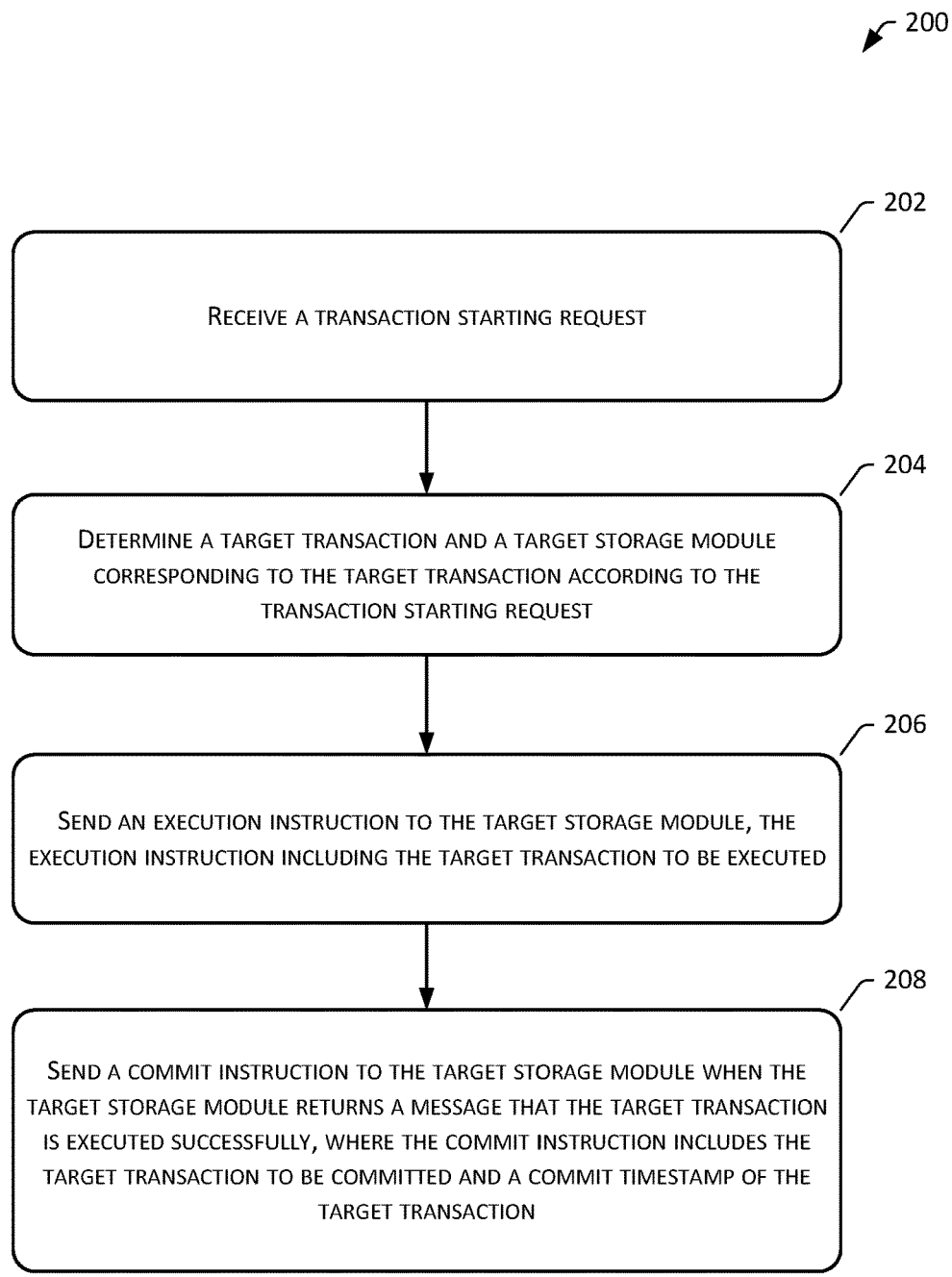
FIG. 2 is a flowchart of s first data processing method provided by an embodiment of the present disclosure.

FIG. 2 shows a flowchart of a data processing method 200 provided according to an embodiment of the present disclosure, which is applied to the computing module in the distributed database system shown in FIG. 1, and in implementations includes the following steps:

Step 202: Receive a transaction starting request.

In practical applications, when a user wants to execute a certain transaction in the distributed database system, an application program can send a transaction starting request to the computing module in the distributed database system. The computing module receives the transaction starting request, and starts the entire process of subsequent execution tasks. The distributed database system here may refer to PolarDB-X or other distributed databases, which is not limited in the present disclosure.

Step 204: Determine a target transaction and a target storage module corresponding to the target transaction according to the transaction starting request.

In implementations, on the basis of receiving the transaction starting request, further, a target transaction and a target storage module corresponding to the target transaction are determined according to the transaction starting request.

The target transaction refers to a transaction indicated by the transaction starting request, and the target storage module refers to a storage module involved in executing the target transaction. The storage module here may be a single-chip database in a distributed database system, such as a single-chip MySQL.

In practical applications, after receiving a transaction starting request, the computing module first needs to determine a specific transaction indicated by the request. Since the transaction is ultimately executed by the storage module, the computing module needs to further determine the storage module that executes the transaction. Since a transaction is an execution unit composed of multiple SQL statements, a transaction may include multiple SQL operations, which may be executed by different storage modules. Therefore, a transaction may involve multiple storage modules, that is, target storage modules that are determined and found may be more than one.

In implementations, when the user wants to execute a certain transaction in the distributed database system, he/she can directly specify a storage module that executes the transaction. At this time, the application program will include a transaction identification corresponding to the transaction to be executed and an identification of the storage module that executes the transaction in a transaction starting request and send the transaction starting request to the computing module. The computing module can directly determine the target transaction and the target storage module corresponding to the target transaction based on the transaction identification and the corresponding storage module identification included in the transaction starting request that is received. A specific implementation process is as follows:

determining a transaction indicated by the transaction identification as the target transaction; and determining a storage module indicated by the storage module identification as the corresponding target storage module.

In implementations, a transaction identification is used to identify a transaction to be executed, and a storage module identification is used to identify a storage module that executes the transaction.

For example, if the user wants to execute a transaction A in the distributed database system, and the user specifies a storage module 1 and a storage module 2 to execute the transaction A. At this time, the user can send a transaction starting instruction carrying the transaction A, the storage module 1 and the storage module 2 to the computing module in the distributed database system through an application program. After receiving the transaction starting instruction, the computing module can determine that a target transaction to be executed is the transaction A, and storage modules for executing the transaction A are the storage module 1 and the storage module 2.

A transaction identification and corresponding storage module identification(s) are directly included in a transaction starting request. The computing module can directly determine a target transaction and target storage module(s) corresponding to the target transaction according to the identifications. A determination process is simple and easy, and does not require the computing module to perform complex calculations, which saves computing resources to a certain extent.

In implementations, when the user wants to execute a certain transaction in the distributed database system, a storage module for executing the transaction may not be specified. The computing module may specify a corresponding storage module to execute the target transaction based on parameters such as performance attributes, load, etc. At this time, the application program only needs to include the transaction identification corresponding to the transaction to be executed in the transaction starting request and sends the transaction starting request to the computing module. After determining the target transaction to be executed, the computing module can specify a target storage module for executing the target transaction. A specific implementation process is as follows:

determining a transaction indicated by a transaction identification as the target transaction; and determining a target storage module corresponding to the target transaction according to a preset allocation rule.

In implementations, the preset allocation rule refers to a rule for allocating storage module(s) for a target transaction to be executed. The rule is pre-set by a technical person, which can be a load balancing rule or a storage module performance rule. The present disclosure does not impose any specific limitations on the allocation rule, as long as the rule can allocate reasonable storage module(s) for the target transaction.

For example, the preset allocation rule is load balancing. If the distributed database system includes a storage module 1 and a storage module 2, transactions currently executed or to be executed by the storage module 1 include a transaction A and a transaction B, and a transaction currently executed or to be executed by the storage module 2 is transaction C. At this time, a user sends a transaction starting instruction to the computing module in the distributed database system through an application program, and the instruction includes transaction D. After receiving the transaction starting instruction, the computing module determines that a target transaction to be executed is the transaction D, and then determines that a storage module to execute the transaction D is the storage module 2 according to the load balancing rule.

Only a transaction identification is included in a transaction starting request. After determining a target transaction, the computing module allocates a corresponding target storage module for the target transaction according to the pre-set allocation rule, which can flexibly specify the storage module for executing the transaction according to parameters such as performance attributes, and loads, etc., and adapt to the actual situation of each storage module in the distributed database system, thus ensuring that transactions can be executed efficiently and accurately, and having higher adaptability.

In the present disclosure, a target transaction and a target storage module that executes the target transaction can be directly specified in the transaction starting request, or not specified with the computing module allocating a storage module for executing the target transaction, which is more flexible and can adapt to characteristics of executions of different transactions, so that target transaction can be executed more efficiently and accurately.

Step 206: Send an execution instruction to the target storage module, the execution instruction including the target transaction to be executed.

In implementations, on the basis of determining the target transaction and the target storage module corresponding to the target transaction according to the transaction starting request, an execution instruction is further sent to the target storage module, and the execution instruction includes a target transaction to be executed.

In implementations, after the computing module determines the target transaction and the target storage module that executes the target transaction, the target storage module does not know that it is selected to start executing the target transaction. After the target transaction and the target storage module corresponding to the target transaction are determined based on the transaction starting request, and before the execution instruction is sent to the target storage module, the computing module can also notify the target storage module to start the target transaction. A specific implementation process is as follows:

sending a target transaction starting request to the target storage module; and executing the operation step of sending the execution instruction to the target storage module when the target storage module returns a start message.

In implementations, subsequently after the target storage module executes the target transaction, the computing module also needs to send a commit instruction to the target storage module, so that the target storage module commits the target transaction. Therefore, after the computing module sends the execution instruction to the target storage module, it is also necessary to record the storage module identification of the target storage module, so as to facilitate the subsequent sending of the commit instruction to the target storage module.

Step 208: Send a commit instruction to the target storage module when the target storage module returns a message that the target transaction is executed successfully, where the commit instruction includes the target transaction to be committed and a commit timestamp of the target transaction.

In implementations, on the basis of sending the execution instruction to the target storage module, further, when the target storage module returns a message that the execution of the target transaction is successful, a commit instruction is sent to the target storage module, and the commit instruction includes the target transaction to be committed and a commit timestamp of the target transaction.

In practical applications, after receiving the execution instruction, the target storage module will execute the target transaction. If the target transaction is executed successfully, the target storage module will return a message of successful execution to the computing module to notify the computing module that it has successfully executed the target transaction, and ready to commit. After receiving the message of successful execution, the computing module can control the storage module to commit the target transaction.

In implementations, the user causes the distributed database system to execute a corresponding target transaction through the application program, and the target storage module returns a successful execution message to the computing module when the target transaction is executed successfully, Furthermore, at this time, the computing module can also return a message that the execution of the target transaction is completed to the application program, and the application program will return a transaction commit message to the computing module, so that the computing module controls the target storage module to commit the transaction.

In implementations, in order to make binary logs generated when each storage module commits transactions have a chronological order, when the computing module sends a commit instruction to the target storage module, the computing module will include a commit timestamp of the target transaction in the instruction. Therefore, before sending the commit instruction to the target storage module, the computing module can also obtain a commit timestamp of the target transaction in a globally order. A specific implementation is as follows:
 applying to a timestamp generator for a globally ordered timestamp; and
 determining the timestamp as the commit timestamp of the target transaction.

In implementations, the timestamp generator may be a TSO in the distributed database system, and the commit timestamp of the target transaction obtained from the TSO is commit_timestamp.

In a process of practical application, in addition to receiving DML operations related to adding, deleting, and modifying data, the computing module may also receive DDL events, such as changing column types, lengths, adding constraints, and other events. During a DDL change process of the distributed database system, there will be two versions of schema metadata of the database at the same time. For example, in an operation of adding a column, the new column is visible to some shards, but is not yet visible to some shards. At this time, two versions of data are generated at the same time. In a process of transferring these two versions of data to a downstream system (such as stand-alone MySQL) through a logical binlog queue, it is necessary to put the DDL event in an appropriate position of the message queue to ensure that the downstream system can correctly accept these two versions of the data, and there will be no inconsistency of the same piece of data in the downstream system. A specific implementation process is as follows:
 determining an execution logic of a form processing event if the form processing event is detected;
 generating a timestamp of the form processing event according to the execution logic; and
 generate a binary log of the form processing event based on the timestamp.

The form processing event refers to a DDL event, for example, adding a column, increasing the length of a column, adding a default value of a column, deleting a column, shortening a column, and the like.

In implementations, a specific implementation process of determining the execution logic of the form processing event may be:
 determining an operation type of the form processing event;
 determining a compatibility type corresponding to the form processing event according to the operation type; and
 determining the execution logic of the form processing event according to the compatibility type.

The operation type is set, and different operation types correspond to different compatibility types.

In implementations, a specific implementation process operation the compatibility type corresponding to the form processing event according to the operation type may be:
 if the operation type belongs to a first type, determine that the compatibility type corresponding to the form processing event is that a first version is compatible with a second version, the first version being a version before an execution of the form processing event, and the second version being a version after the execution of the form processing event; and if the operation type belongs to a second type, determine that the compatibility type corresponding to the form processing event is that the second version is compatible with the first version.

In implementations, a Schema structure (including a tabular structure, etc.) at a moment is called a version, a version before an execution of a DDL event is called the first version, and a version after the execution of the DDL event is called the second version. It should be noted that a Va version being compatible with a Vb version means that: data using the Vb version can be written to a target end using the Va version; after the data is read from the target end using the Va version, the data includes enough information, which can be converted to Vb version data after certain conversion, and is completely the same as the original data.

In addition, the first type is a type of operation that the first version is compatible with the second version. For example, operations such as deleting a column, shortening the length of a column, deleting a table, and reducing the precision of a column are all of the first type. The second type is a type of operation that the second version is compatible with the first version, for example, operations such as adding a column, increasing the length of a column, adding a default value of a column, creating and deleting an index, creating and deleting a constraint (creating a unique key constraint), building a table and increasing the precision of a column are all of the second type.

In implementations, a specific implementation process of determining the execution logic of the form processing event according to the compatibility type may be:
 if the compatibility type corresponding to the form processing event is that the first version is compatible with the second version, determine that the execution logic of the form processing event is a post-order execution;
 if the compatibility type corresponding to the form processing event is that the second version is compatible with the first version, determine that the execution logic of the form processing event is a pre-order execution.

In implementations, if the execution logic of the form processing event is the pre-order execution, before binary logs corresponding to all data of the second version are generated, a timestamp of the form processing event is obtained. If the execution logic of the form processing event is the post-order execution, the timestamp of the form processing event is obtained after binary logs corresponding to all data of the first version are generated.

Figure 3:
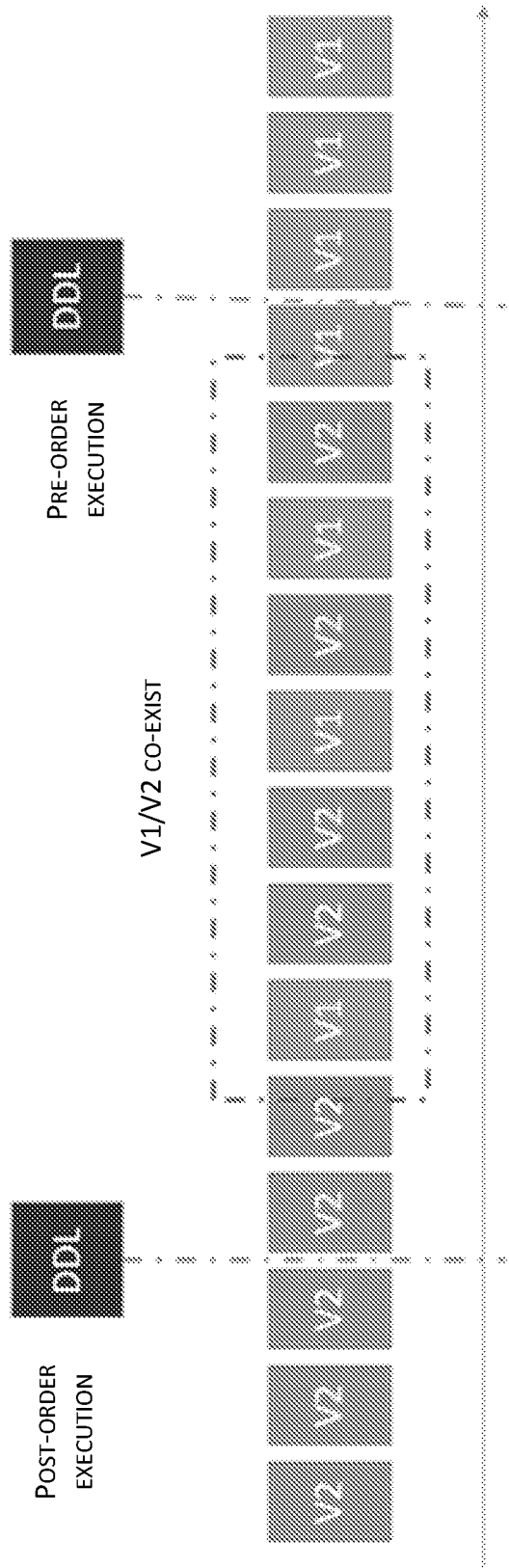
FIG. 3 is a schematic diagram of pre-order execution and post-order execution provided by an embodiment of the present disclosure.

In practical applications, as shown in FIG. 3, the pre-order execution refers to a binary log of a DDL event being at the front of binary logs of all data of the second version (V2). Therefore, before the corresponding binary logs of all the data of the second version (V2) re generated, a timestamp is obtained and used as a timestamp of the DDL event, that is, the DDL event needs to be located before all the binary logs of the second version (V2). The post-order execution refers to a binary log of a DDL event being at the end of binary logs of all data of the first version (V1). Therefore, after the binary logs corresponding to all the data of the first version (V1) are generated, a timestamp is obtained and used as a timestamp of the DDL event, that is, the DDL event needs to be located after all the binary logs of the first version (V1).

In addition, for operation types of certain form processing events (DDL events), the first version can be compatible with the second version, and the second version can also be compatible with the first version. At this time, the execution logic of a form processing event can be post-order execution, or can be pre-order execution.

When a form processing event is detected, a timestamp of the form processing event is generated according to the execution logic of the form processing event, and then a binary log of the form processing event can be generated according to the timestamp, so that the binary log for the form processing event can be in an appropriate place to ensure the consistency of subscription data for downstream applications.

In the data processing method provided in the present disclosure, the computing module receives a transaction starting request, and determines a target transaction and a target storage module corresponding to the target transaction according to the transaction starting request; then sends an execution instruction to the target storage module; sends a commit instruction to the target storage module when the target storage module returns a message that the target transaction is executed successfully, the commit instruction including the target transaction to be committed and a commit timestamp of the target transaction. In this case, the computing module can apply for a globally ordered timestamp from a timestamp generator, use such timestamp as the commit timestamp of the target transaction, and send it to the target storage module, so that the target storage module can subsequently generate a binary log with the globally ordered timestamp. As such, binary logs generated by two operations of different times in the distributed database system can be arranged in order, avoiding an occurrence of incorrect ordering of transaction operations, and ensuring the consistency of subscription data of downstream applications.

Figure 4:
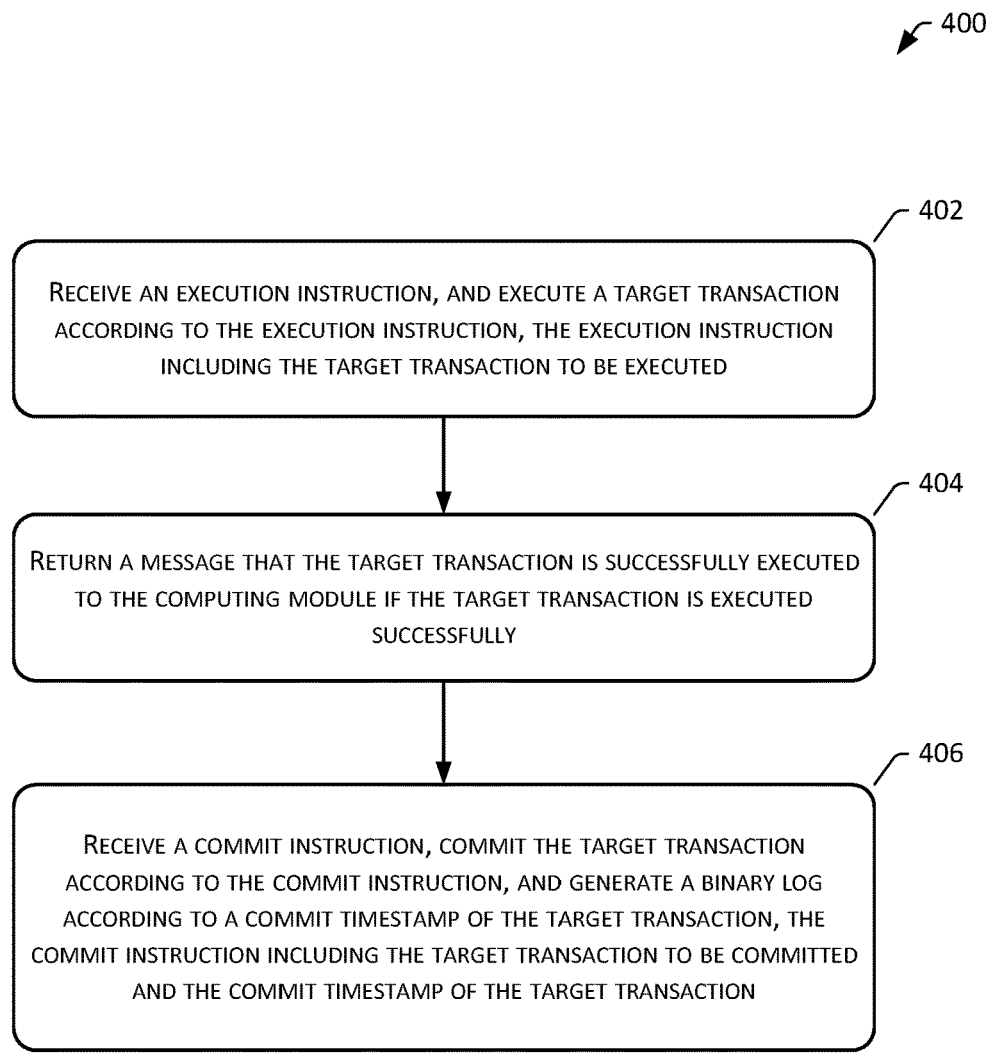
FIG. 4 is a flowchart of a second data processing method provided by an embodiment of the present disclosure.

FIG. 4 shows a flowchart of a data processing method provided 400 according to an embodiment of the present disclosure, which is applied to the storage module in the distributed database system shown in FIG. 1, and in implementations includes the following steps:

Step 402: Receive an execution instruction, and execute a target transaction according to the execution instruction, the execution instruction including the target transaction to be executed.

In practical applications, after the computing module determines a target transaction and a target storage module that executes the target transaction, the target storage module itself does not know that it is selected to start executing the target transaction. Therefore, the target storage module will receive the target transaction starting request sent by the computing module before receiving an execution instruction. When the target storage module receives the target transaction starting request, the target storage module will start the target transaction and notify the computing module that it is ready to execute the target transaction. Before executes the target transaction according to the execution instruction after receiving the execution instruction, the target storage module also needs to return a start message to the computing module when receiving the target transaction starting request.

Step 404: Return a message that the target transaction is successfully executed to the computing module if the target transaction is executed successfully.

In implementations, on the basis of receiving the execution instruction and executing the target transaction according to the execution instruction, further, if the target transaction is successfully executed, a message of successful execution of the target transaction is returned to the computing module.

Step 406: Receive a commit instruction, commit the target transaction according to the commit instruction, and generate a binary log according to a commit timestamp of the target transaction, the commit instruction including the target transaction to be committed and the commit timestamp of the target transaction.

In implementations, when the target transaction is successfully executed, on the basis of returning the message that the target transaction is successfully executed to the computing module, further, a commit instruction is received. The target transaction is committed according to the commit instruction, and a binary log is generated according to the commit timestamp of the target transaction.

In practical applications, the binary log is binlog, and a binary log generated by each storage module is called a physical binlog.

In implementations, a specific implementation process of generating the binary log according to the commit timestamp of the target transaction may be: generating a binary log, and recording the commit timestamp of the target transaction in a comment of the binary log.

In the data processing method provided in the present disclosure, the target storage module receives an execution instruction, and executes a target transaction according to the execution instruction; and returns a message that the target transaction is successfully executed to the computing module when the target transaction is successfully executed; and receives a commit instruction, commits the target transaction according to the commit instruction, and generate a binary log according to a commit timestamp of the target transaction. In this case, each storage module generates a binary log according to a commit timestamp of a target transaction sent by the computing module, and each binary log carries a globally ordered timestamp, so that binary logs generated by two operations of different times in the distributed database system can be arranged in order, thus preventing operations of transactions from being out of order, and ensuring the consistency of subscription data of downstream applications.

Figure 5:
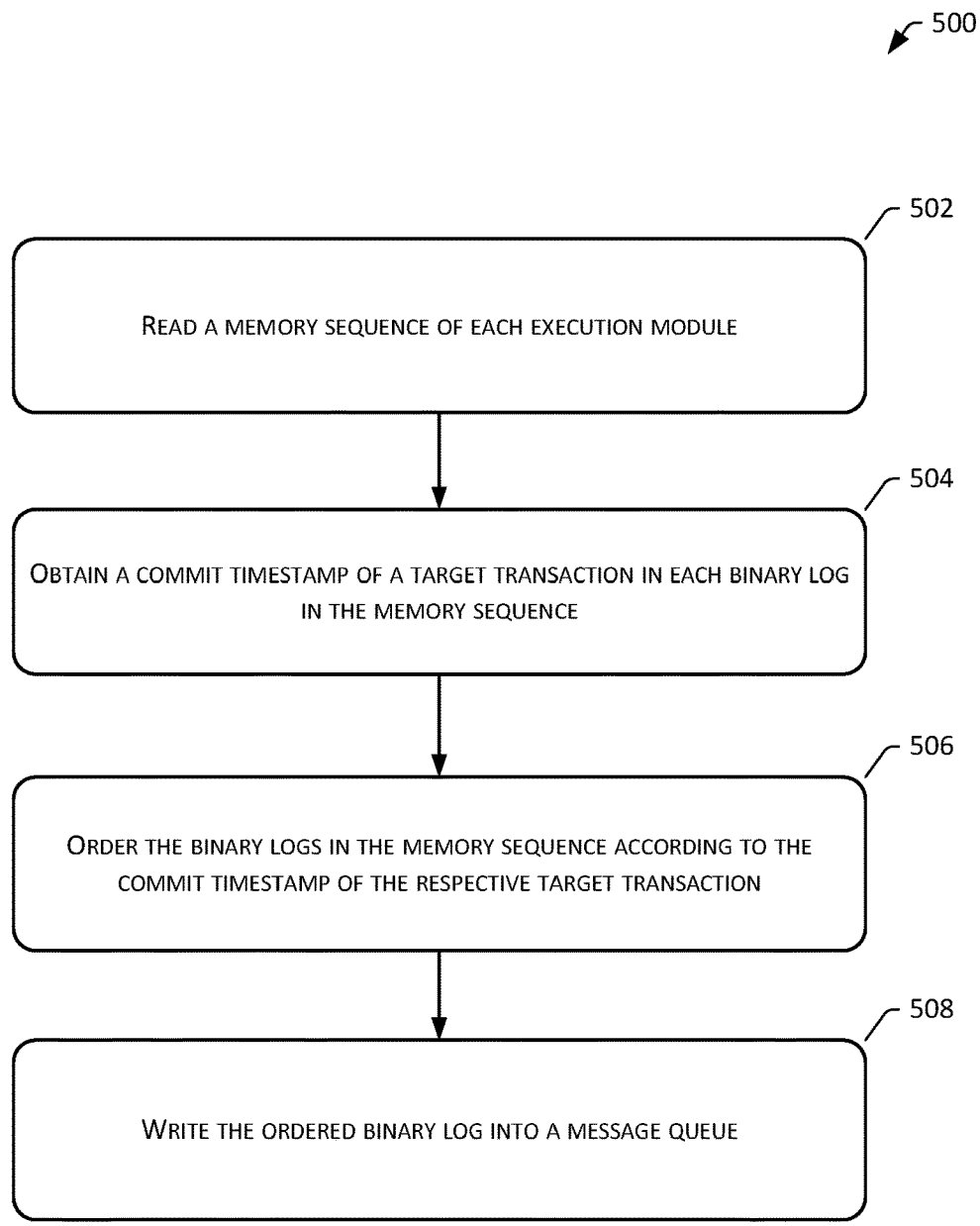
FIG. 5 is a flowchart of a third data processing method provided by an embodiment of the present disclosure.

FIG. 5 shows a flowchart of a data processing method provided 500 according to an embodiment of the present disclosure, which is applied to the ordering module in the distributed database system, and in implementations includes the following steps:

Step 502: Read a memory sequence of each execution module.

In practical applications, each execution module corresponds to a storage module. Before the ordering module reads a memory sequence of each execution module, the execution module can also read binary logs of its corresponding storage module, and generate a memory sequence according to the binary logs.

In implementations, the execution module here can refer to a Jingwei worker generated by PolarDB-X, which is a module that executes work. The ordering module can refer to a Jingwei merger generated by PolarDB-X, which is used to control the generated Jingwei worker, and is a merging and ordering module that can combine multiple ordered queues into a global ordered queue.

Each execution module in the present disclosure generates a memory sequence. The memory sequence includes all binary logs generated by its corresponding storage module. When ordering the binary logs subsequently, the binary logs in the memory sequence only need to be obtained, and it is not necessary to obtain each binary log generated by the storage module one by one. The operation thereof is simple and convenient, thus facilitating for subsequent ordering.

Step 504: Obtain a commit timestamp of a target transaction in each binary log in the memory sequence.

In implementations, on the basis of reading the memory sequence of each execution module, further, a commit timestamp of a respective target transaction in each binary log in the memory sequence is obtained.

Step 506: Order the binary logs in the memory sequence according to the commit timestamp of the respective target transaction.

In implementations, on the basis of obtaining the commit timestamp of the respective target transaction in each binary log in the memory sequence, further, the binary logs in the memory sequence are ordered according to the commit timestamp of the respective target transaction.

Step 508: Write the ordered binary log into a message queue.

In implementations, on the basis of ordering the binary logs in the memory sequence according to the commit timestamp of the respective target transaction, further, the ordered binary logs are written into a message queue.

In practical applications, the message queue can refer to a kafka message queue, which is an open source message queue. The ordered binary logs are written into the message queue, which generates a logical binlog of the distributed database system. When downstream applications need to subscribe to the data in the distributed database, the logical binlog in the open source message queue can be directly read to obtain the binary logs of the storage module in the distributed database system, and the binary logs are arranged in an orderly manner in the message queue.

In implementations, after ordering the current binary logs of the storage module, the storage module may execute a new transaction and generate a new binary log. Therefore, when the execution module detects that its corresponding storage module generates a new binary log, returning to and executing the operation steps of reading the binary logs of the corresponding storage module and generating the memory sequence according to the binary log can be performed. At this time, the ordering module can reorder all the binary logs, and a specific implementation process thereof is as follows:

returning to the operation step of reading the memory sequence of each execution module if detecting that the memory sequence of the execution module changes.

In practical applications, if detecting that the memory sequence of the execution module has changed, this means that the storage module corresponding to the execution module has executed a new transaction and generated a new binary log. At this time, the ordering module returns to execute steps 502-508 to reorder all the logs.

In implementations, after ordering the current binary logs of the storage module, the storage module may execute a new transaction and generate a new binary log. Therefore, in response to the execution module detecting that its corresponding storage module generates a new binary log, returning to the operation steps of reading the binary logs of the corresponding storage module and generating the memory sequence according to the binary log can be made. Since the newly generated binary log would be later than the ordered binary logs, the ordering module can directly put the binary log added in the execution module into the tail of the message queue at this time.

In the present disclosure, when the storage module executes a new transaction and generates a new binary log, all the binary logs can be reordered, or the newly generated binary log can be directly placed at the end of the message queue, to realize ordering of all the binary logs of the storage module in real time. The ordering method thereof is flexible and can be applied to different situations, making the ordering results to be more efficient and accurate.

In implementations, if the computing module detects a form processing event, a binary log of the form processing event can be generated according to a timestamp of the form processing event. In this case, the ordering module can insert the binary log of the form processing event into a message queue according to the timestamp of the form processing event.

When a form processing event is detected, a timestamp of the form processing event may be generated according to the execution logic of the form processing event, and a binary log of the form processing event may then be generated according to the timestamp. Furthermore, the form processing event can be inserted into a message queue according to the timestamp of the form processing event, so that the form processing event can be placed in an appropriate position in the message queue, ensuring that the downstream system can correctly receive two versions of data that are before and after the execution of the form processing event, and avoiding the inconsistency of the same piece of data in the downstream system.

In the data processing method provided in the present disclosure, the ordering module can read a memory sequence of each execution module, and obtain a commit timestamp of a respective target transaction in each binary log in the memory sequence; and order binary logs in the memory sequence according to the commit timestamp of the respective target transaction, and write the ordered binary logs into a message queue. In this case, the message queue includes binary logs generated by all storage modules in the distributed database system, which are all arranged in a chronological order. When downstream applications need to subscribe to the data in the distributed database, they can directly read the message queue, thus preventing operations associated with transactions from being out of order and ensuring the consistency of subscription data.

Figure 6:
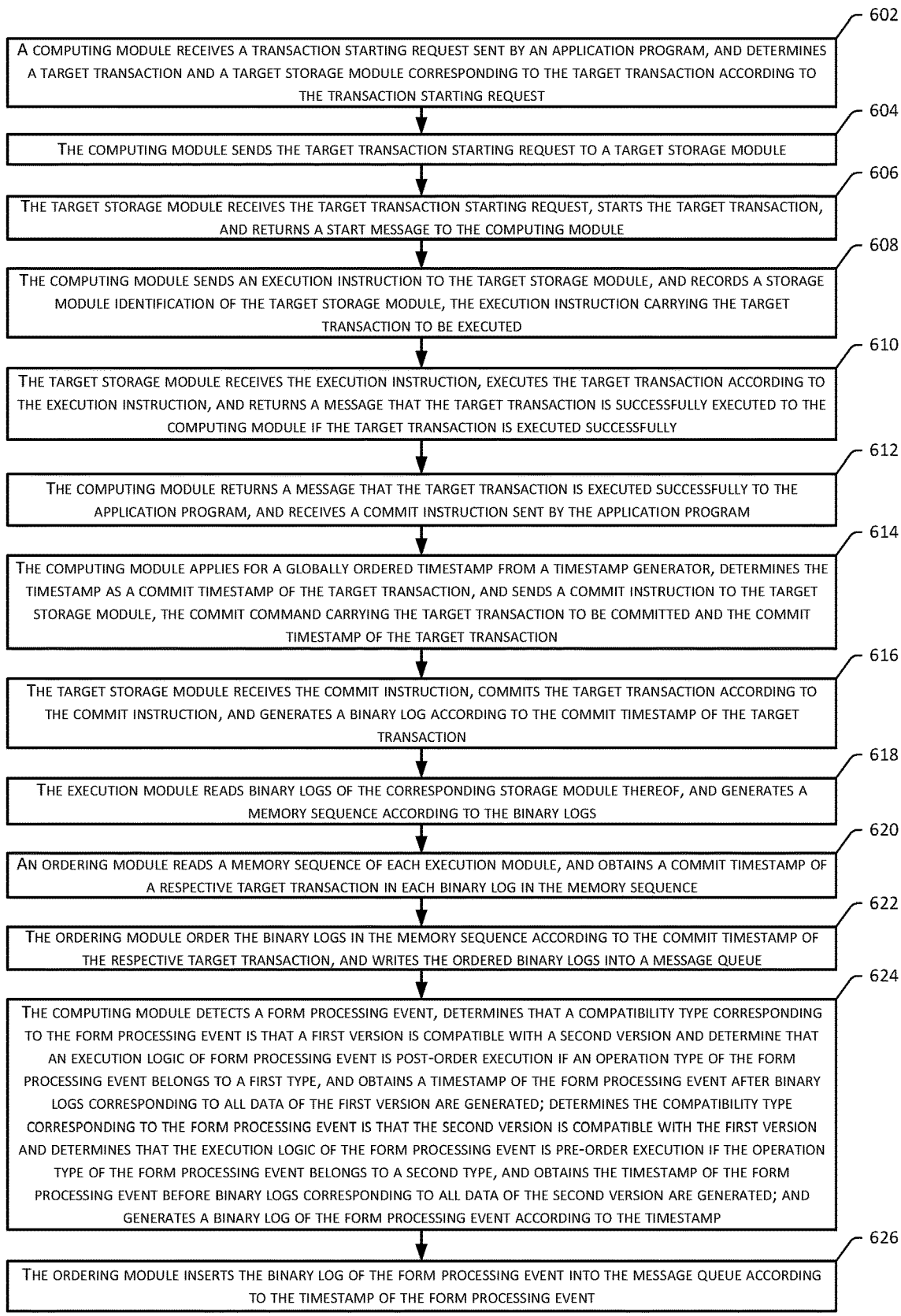
FIG. 6 is a flowchart of a fourth data processing method provided by an embodiment of the present disclosure.

An overall application of the data processing methods provided in the present disclosure in a distributed database system is used as an example, and the data processing methods will be further described. FIG. 6 shows a processing flowchart of a data processing method 600 provided by an embodiment of the present disclosure, which in implementations includes the following steps:

Step 602: A computing module receives a transaction starting request sent by an application program, and determines a target transaction and a target storage module corresponding to the target transaction according to the transaction starting request.

In practical applications, under the circumstance that a transaction includes multiple operations, when an application program sends a transaction starting request to a computing module, the transaction starting request can be sent multiple times. Identifications of multiple operations are carried in multiple requests respectively. As such, the computing module can receive the transaction starting requests multiple times, and each request carries an operation included in the transaction. For example, a target transaction is a transaction A, which includes an operation 1 and an operation 2. At this time, the computing module will first receive a request carrying an identification of the operation 1, and then control a corresponding storage module to perform the operation 1. After the operation 1 is completed, the computing module receives another request carrying an identification of the operation 2, and then controls a corresponding storage module to execute the operation 2. The execution module then commits the entire transaction A after the execution is completed.

Step 604: The computing module sends the target transaction starting request to a target storage module.

Step 606: The target storage module receives the target transaction starting request, starts the target transaction, and returns a start message to the computing module.

Step 608: The computing module sends an execution instruction to the target storage module, and records a storage module identification of the target storage module, the execution instruction carrying the target transaction to be executed.

Step 610: The target storage module receives the execution instruction, executes the target transaction according to the execution instruction, and returns a message that the target transaction is successfully executed to the computing module if the target transaction is executed successfully.

Step 612: The computing module returns a message that the target transaction is executed successfully to the application program, and receives a commit instruction sent by the application program.

Step 614: The computing module applies for a globally ordered timestamp from a timestamp generator, determines the timestamp as a commit timestamp of the target transaction, and sends a commit instruction to the target storage module, the commit command carrying the target transaction to be committed and the commit timestamp of the target transaction.

Step 616: The target storage module receives the commit instruction, commits the target transaction according to the commit instruction, and generates a binary log according to the commit timestamp of the target transaction.

Step 618: The execution module reads binary logs of the corresponding storage module thereof, and generates a memory sequence according to the binary logs.

Step 620: An ordering module reads a memory sequence of each execution module, and obtains a commit timestamp of a respective target transaction in each binary log in the memory sequence.

Step 622: The ordering module order the binary logs in the memory sequence according to the commit timestamp of the respective target transaction, and writes the ordered binary logs into a message queue.

It needs to be noted that, although a transaction may include multiple SQL operations, the SQL operations in a transaction are inherently ordered (that is, the next SQL operation will not be executed until the execution of one SQL operation is completed), and no further ordering is required. Only the chronological order of different transactions may be confused. Therefore, commit timestamps in the present disclosure are intended for transactions as a whole, that is, one transaction corresponding to one commit timestamp.

Step 624: The computing module detects a form processing event, determines that a compatibility type corresponding to the form processing event is that a first version is compatible with a second version and determine that an execution logic of form processing event is post-order execution if an operation type of the form processing event belongs to a first type, and obtains a timestamp of the form processing event after binary logs corresponding to all data of the first version are generated; determines the compatibility type corresponding to the form processing event is that the second version is compatible with the first version and determines that the execution logic of the form processing event is pre-order execution if the operation type of the form processing event belongs to a second type, and obtains the timestamp of the form processing event before binary logs corresponding to all data of the second version are generated; and generates a binary log of the form processing event according to the timestamp.

Step 626: The ordering module inserts the binary log of the form processing event into the message queue according to the timestamp of the form processing event.

Figure 7:
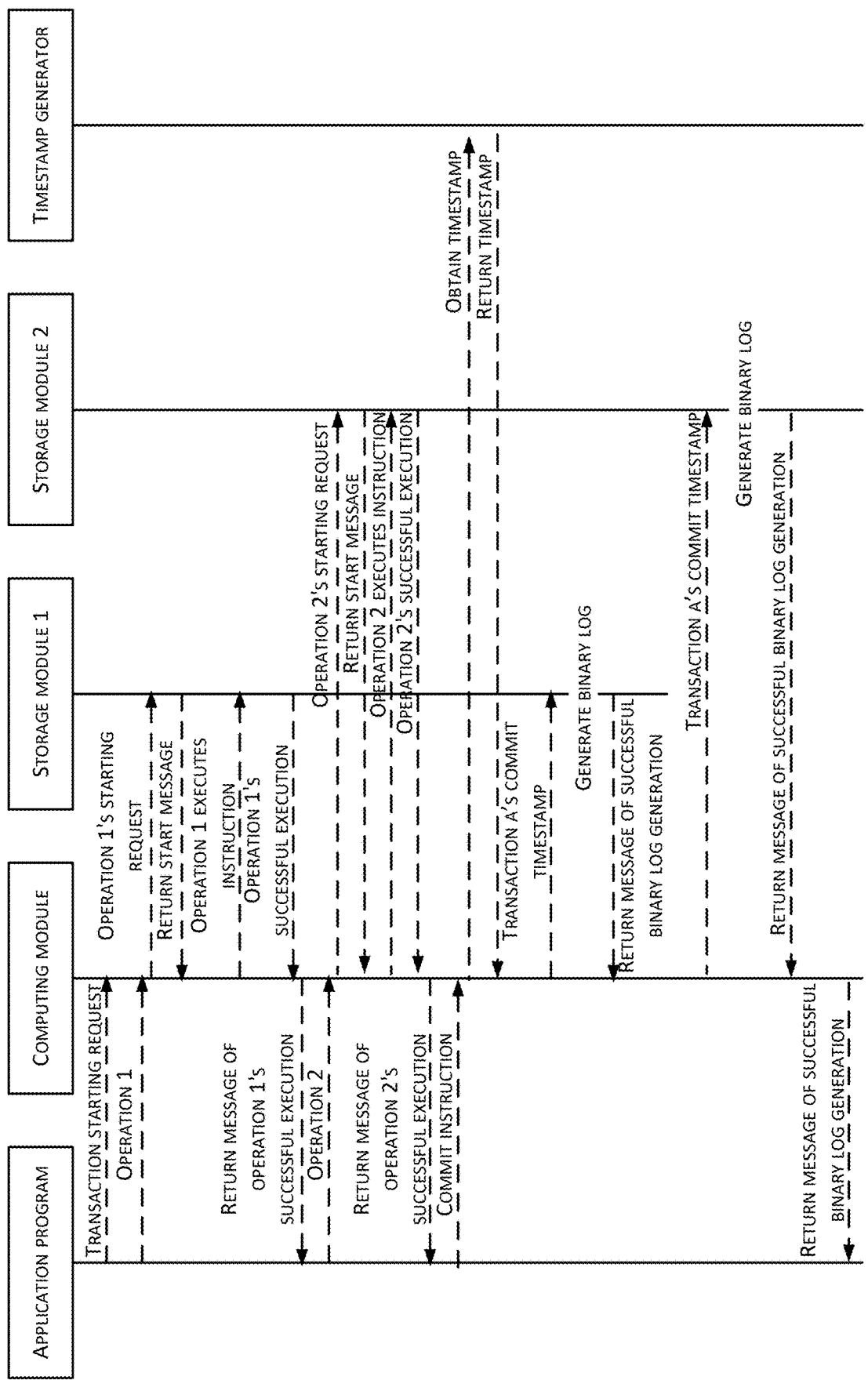
FIG. 7 is a schematic diagram of a binary log generation process provided by an embodiment of the present disclosure.

Next, referring to FIG. 7, if a transaction includes two SQL operations, a complete process of generating a binary log as described above is illustrated as an example:

The application program sends a transaction starting request to the computing module, and the transaction starting request indicates that a target transaction to be started is a transaction A. The transaction A includes two operations: an operation 1 and an operation 2. The operation 1 is executed by a storage module 1, and the operation 2 is executed by a storage module 2. The application program sends the operation 1 to the computing module, and the computing module sends a start request of the operation 1 to the storage module 1. After receiving the start request, the storage module 1 returns a start message to the computing module. After receiving the start message, the computing module sends an execution instruction of the operation 1 to the storage module 1. After receiving the execution instruction, the storage module 1 executes the operation 1, and returns a message that the operation 1 is successfully executed to the computing module after the operation 1 is successfully executed.

After the receiving the message that the operation 1 is successfully executed, the computing module can also return a message that the operation 1 is successfully executed to the application program, and the application program further sends the operation 2 to the computing module. The computing module can then send the operation 2 to the storage module 2. After receiving a start request, the storage module 2 returns a start message to the computing module. After receiving the start message, the computing module sends an execution instruction of the operation 2 to the storage module 2. After receiving the execution instruction, the storage module 2 executes the operation 2. After the operation 2 is executed successfully, the storage module 2 returns a message that the operation 2 is executed successfully to the computing module.

The computing module receives the message that the operation 2 is executed successfully, and returns to the application program a message that the execution of the transaction A is completed (that is, the message that the operation 2 is successfully executed). After receiving this message, the application program sends a commit instruction to the computing module. The computing module obtains a globally ordered timestamp from the timestamp generator, and then sends the timestamp as a commit timestamp of the transaction A to the storage module 1 and the storage module 2. The storage module 1 and the storage module 2 each generate a binary log of the transaction A according to the commit timestamp, and return a message that the binary log is successfully generated respectively.

Figure 8:
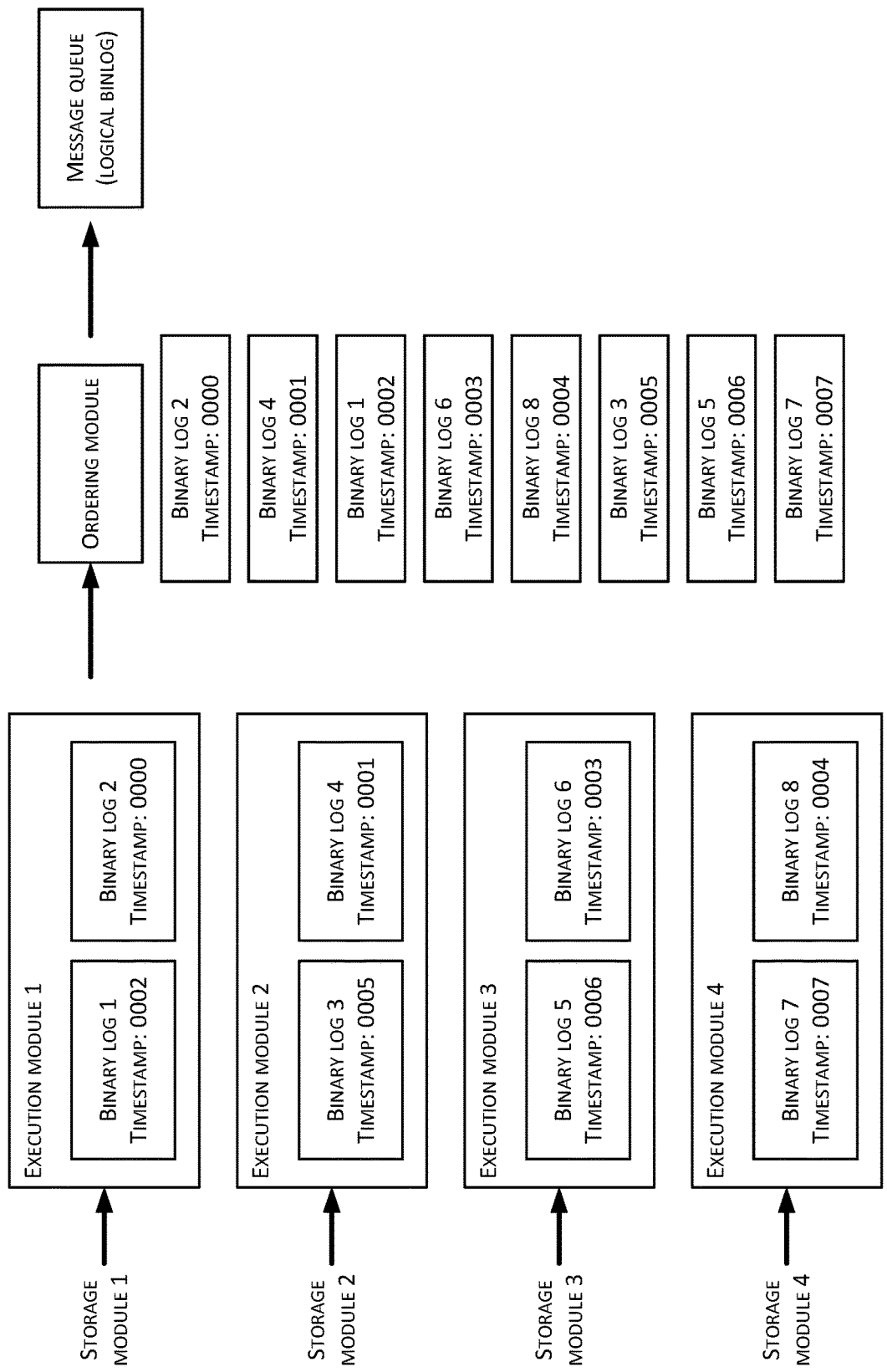
FIG. 8 is a schematic diagram of a sorting process provided by an embodiment of the present disclosure.

Next, in combination with FIG. 8, a complete example is given for the above ordering process:

It is assumed that there are four storage modules, namely a storage module 1, a storage module 2, a storage module 3, and a storage module 4, which correspond to an execution module 1, an execution module 2, an execution module 3, and an execution module 4 respectively. It is assumed that a binary log 1 (timestamp 0002) and a binary log 2 (timestamp 0000) are generated in the storage module 1, and a binary log 3 (timestamp 0005) and a binary log 4 (timestamp 0001) are generated in the storage module 2), a binary log 5 (timestamp 0006) and a binary log 6 (timestamp 0003) are generated in the storage module 3, and a binary log 7 (timestamp 0007) and a binary log 8 (timestamped as 0004) are generated in the storage module 4. The execution module 1, the execution module 2, the execution module 3, and the execution module 4 respectively generate corresponding memory sequences. The ordering module reads the memory sequences of the four execution modules to obtain 8 binary logs, order them according to respective timestamps to obtain the binary log 2, the binary log 4, the binary log 1, the binary log 6, the binary log 8, the binary log 3, the binary log 5, the binary log 7, and put these 8 binary logs into a message queue in the order that they are arranged to generate a logical binlog.

In the data processing method provided in the present disclosure, the target storage module can generate binary logs according to commit timestamps of target transactions. The ordering module then orders all the binary logs according to the commit timestamps of the target transactions, and writes the ordered binary log Logs to a message queue. In this case, each binary log carries a globally ordered timestamp, and the message queue will include binary logs generated by all storage modules in the distributed database system, which are all arranged in a chronological order. When a downstream application needs to subscribe to the data in the distributed database, the downstream application can directly read the message queue, so that binary logs generated by two operations of different times in the distributed database system are arranged in a correct order, thus preventing the operations of a transaction from being out of order, and ensuring the consistency of subscription data of the downstream application.

It should be noted that the technical solutions in this embodiment belongs to the same concept as the technical solutions of the data processing methods shown in FIG. 2, FIG. 4 and FIG. 5 above. Specific contents of the technical solutions of the data processing method that are not described in detail can be referenced to the description of the technical solutions of the data processing methods shown in FIG. 2, FIG. 4 and FIG. 5 above.

Figure 9:
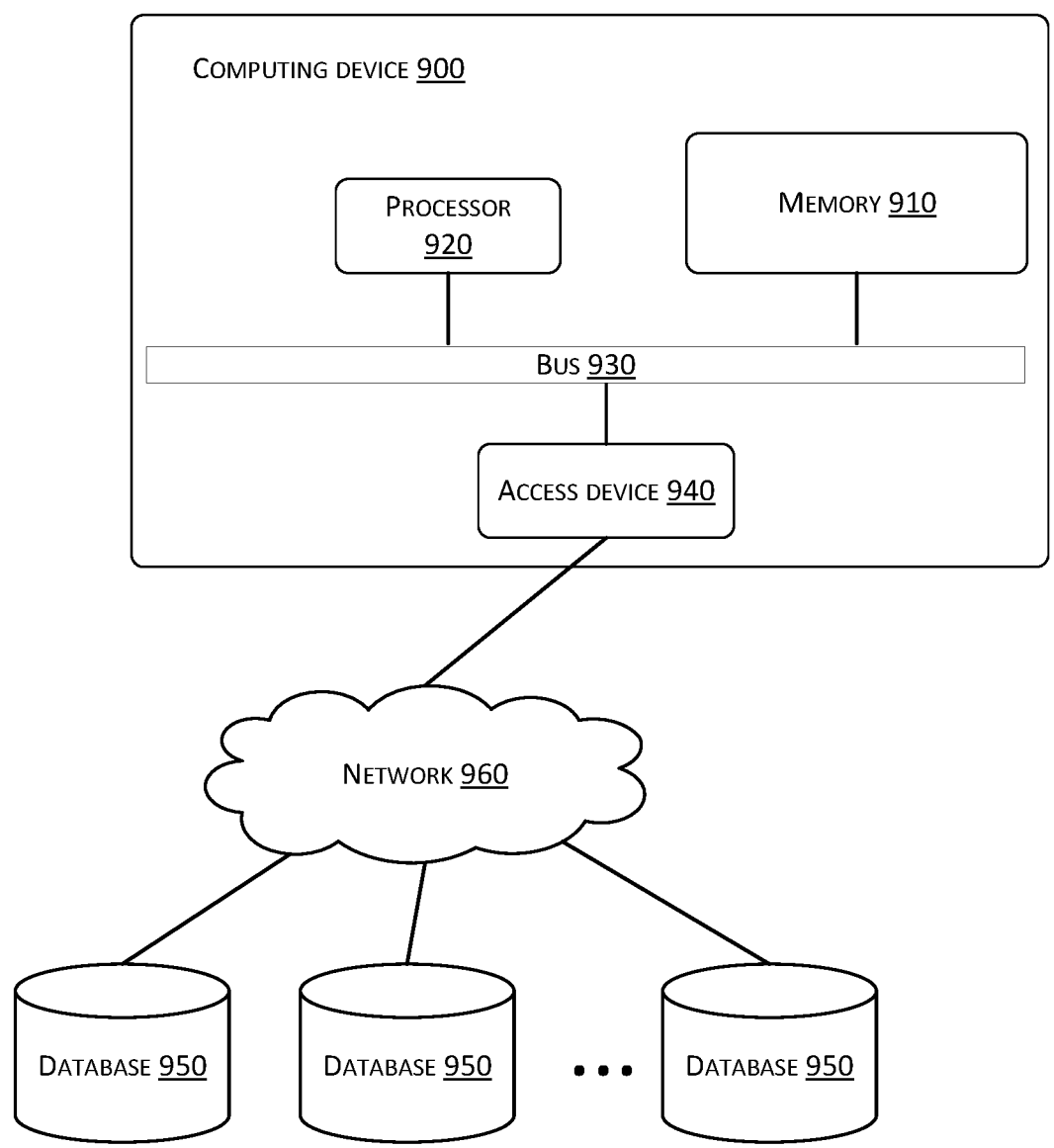
FIG. 9 is a structural block diagram of a first computing device provided by an embodiment of the present disclosure.

FIG. 9 shows a structural block diagram of a computing device 900 provided according to an embodiment of the present disclosure. Components of the computing device 900 include, but are not limited to, a memory 910 and a processor 920. The processor 920 is connected to the memory 910 through a bus 930, and a database 950 is used for storing data.

The computing device 900 also includes an access device 940 that enables the computing device 900 to conduct communications via one or more networks 960. Examples of these networks include Public Switched Telephone Network (PSTN), Local Area Network (LAN), Wide Area Network (WAN), Personal Area Network (PAN), or a combination of communication networks such as the Internet. The access device 940 may include one or more of any wired or wireless type of network interfaces (e.g., a network interface card (NIC)), such as an IEEE 802.11 wireless local area network (WLAN) wireless interface, a Worldwide Interoperability for Microwave Access (Wi-MAX) interface, an Ethernet interface, a Universal Serial Bus (USB) interface, a cellular network interface, a Bluetooth interface, a Near Field Communication (NFC) interface, etc.

In an embodiment of the present disclosure, the above-mentioned components of the computing device 900 and other components that are not shown in FIG. 9 may also be connected to each other, for example, through a bus. It needs to be understood that the structural block diagram of the computing device shown in FIG. 9 is only intended for illustration, rather than limiting the scope of the present disclosure. One skilled in the art can add or replace other components as needed.

The computing device 900 can be any type of stationary or mobile computing device, including a mobile computer or a mobile computing device (e.g., a tablet computer, a personal digital assistant, a laptop computer, a notebook computer, a netbook, etc.), a mobile phone (e.g., a smartphone), a wearable computing device (e.g., smart watches, smart glasses, etc.), or other types of mobile devices, or a stationary computing device such as a desktop computer or a PC. The computing device 900 may also be a mobile or stationary server.

The processor 920 is configured to execute the following computer-executable instructions:
    receiving a transaction starting request;
    determining a target transaction and a target storage module corresponding to the target transaction based on the transaction starting request;
    sending an execution instruction to the target storage module, the execution instruction including the target transaction to be executed;
    sending a commit instruction to the target storage module when the target storage module returns a message that the target transaction is executed successfully, the commit instruction including the target transaction to be committed and a commit timestamp of the target transaction.

Figure 10:
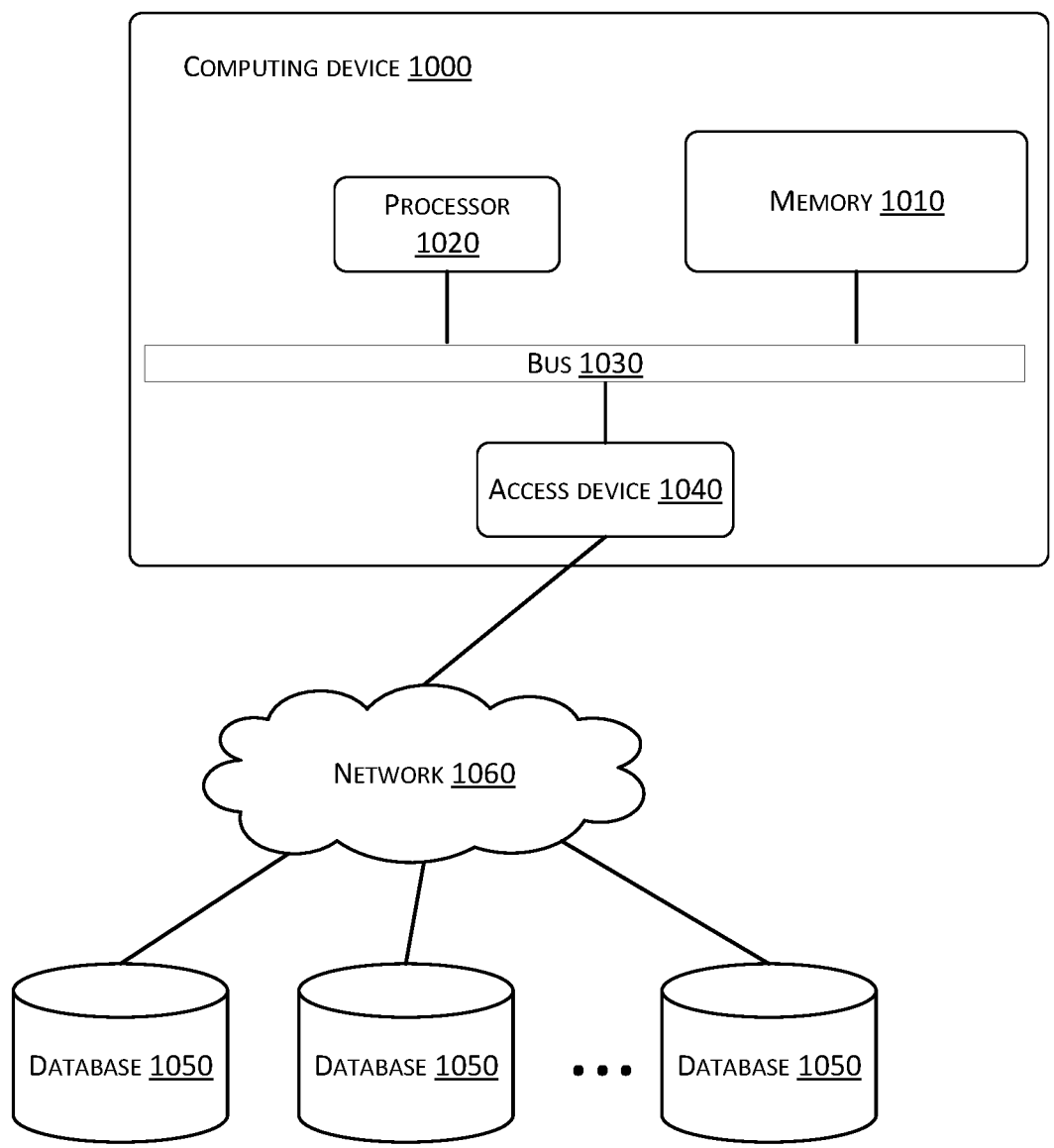
FIG. 10 is a structural block diagram of a second computing device provided by an embodiment of the present disclosure.

FIG. 10 shows a structural block diagram of a computing device 1000 provided according to an embodiment of the present disclosure. Components of the computing device 1000 include, but are not limited to, a memory 1010 and a processor 1020. The processor 1020 is connected to the memory 1010 through a bus 1030, and a database 1050 is used for storing data.

The computing device 1000 also includes an access device 1040 that enables the computing device 1000 to conduct communications via one or more networks 1060. Examples of these networks include Public Switched Telephone Network (PSTN), Local Area Network (LAN), Wide Area Network (WAN), Personal Area Network (PAN), or a combination of communication networks such as the Internet. The access device 1040 may include one or more of any type of wired or wireless network interface (e.g., a network interface card (NIC)), such as an IEEE 802.11 Wireless Local Area Network (WLAN) wireless interface, a Worldwide Interoperability for Microwave Access (Wi-MAX) interface, an Ethernet interface, a Universal Serial Bus (USB) interface, a cellular network interface, a Bluetooth interface, a Near Field Communication (NFC) interface, etc.

In an embodiment of the present disclosure, the above-mentioned components of the computing device 1000 and other components that are not shown in FIG. 10 may also be connected to each other, for example, through a bus. It needs to be understood that the structural block diagram of the computing device shown in FIG. 10 is only intended for illustration, rather than limiting the scope of the present disclosure. One skilled in the art can add or replace other components as needed.

The computing device 1000 can be any type of stationary or mobile computing device, including a mobile computer or a mobile computing device (e.g., a tablet computer, a personal digital assistant, a laptop computer, a notebook computer, a netbook, etc.), a mobile phone (e.g., a smartphone), a wearable computing device (e.g., smart watches, smart glasses, etc.), or other types of mobile devices, or a stationary computing device such as a desktop computer or a PC. The computing device 1000 may also be a mobile or stationary server.

The processor 1020 is configured to execute the following computer-executable instructions:
  executing a target transaction according to an execution instruction after receiving the execution instruction, the execution instruction including the target transaction to be executed;
  returning a message that the target transaction is successfully executed to the computing module when the target transaction is successfully executed; and
  receiving a commit instruction, committing the target transaction according to the commit instruction, and generating a binary log according to a commit timestamp of the target transaction, the commit instruction including the target transaction to be committed and the commit timestamp of the target transaction.

Figure 11:
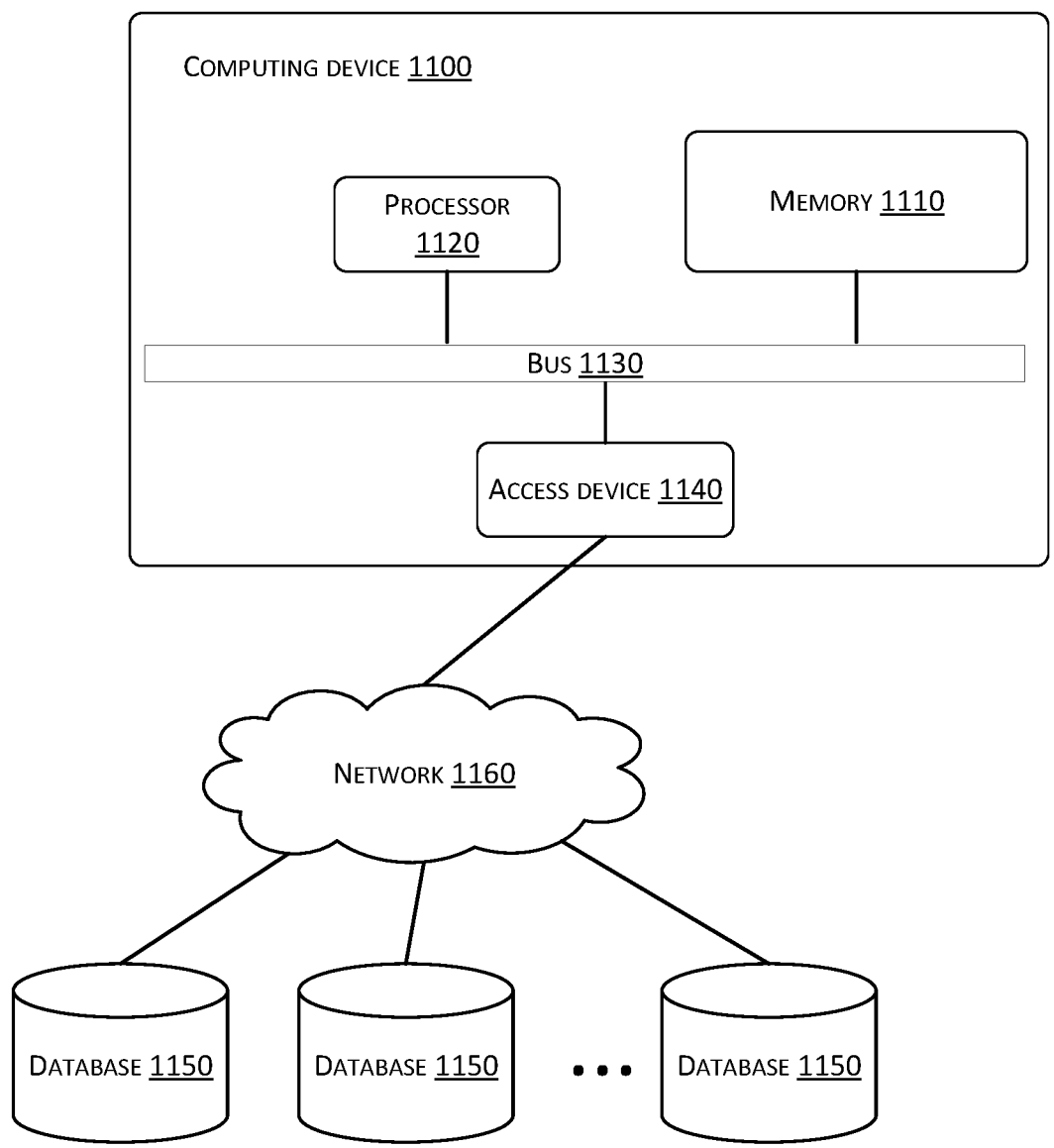
FIG. 11 is a structural block diagram of a third computing device provided by an embodiment of the present disclosure.

FIG. 11 shows a structural block diagram of a computing device 1100 provided according to an embodiment of the present disclosure. Components of the computing device 1100 include, but are not limited to, a memory 1110 and a processor 1120. The processor 1120 is connected to the memory 1110 through a bus 1130, and a database 1150 is used for storing data.

The computing device 1100 also includes an access device 1140 that enables the computing device 1100 to conduct communications via one or more networks 1160. Examples of these networks include Public Switched Telephone Network (PSTN), Local Area Network (LAN), Wide Area Network (WAN), Personal Area Network (PAN), or a combination of communication networks such as the Internet. The access device 1140 may include one or more of any type of wired or wireless network interface (e.g., a network interface card (NIC)), such as an IEEE 802.11 Wireless Local Area Network (WLAN) wireless interface, a Worldwide Interoperability for Microwave Access (Wi-MAX) interface, an Ethernet interface, a Universal Serial Bus (USB) interface, a cellular network interface, a Bluetooth interface, a Near Field Communication (NFC) interface, etc.

In an embodiment of the present disclosure, the above-mentioned components of the computing device 1100 and other components that are not shown in FIG. 11 may also be connected to each other, for example, through a bus. It needs to be understood that the structural block diagram of the computing device shown in FIG. 11 is only intended for illustration, rather than limiting the scope of the present disclosure. One skilled in the art can add or replace other components as needed.

The computing device 1100 can be any type of stationary or mobile computing device, including a mobile computer or a mobile computing device (e.g., a tablet computer, a personal digital assistant, a laptop computer, a notebook computer, a netbook, etc.), a mobile phone (e.g., a smartphone), a wearable computing device (e.g., smart watches, smart glasses, etc.), or other types of mobile devices, or a stationary computing device such as a desktop computer or a PC. The computing device 1100 may also be a mobile or stationary server.

The processor 1120 is configured to execute the following computer-executable instructions:
  reading a memory sequence of each execution module;
  obtaining a commit timestamp of a respective target transaction in each binary log in the memory sequence;
  ordering binary logs in the memory sequence according to the commit timestamp of the respective target transaction; and
  writing the ordered binary logs to a message queue.

The above are schematic solutions of three computing devices in this embodiment. It needs to be noted that the technical solutions of the computing devices and the technical solutions of the foregoing data processing methods belong to the same concept, and specific contents that are not described in detail in the technical solutions of the computing devices can be referenced to the descriptions of the technical solutions of the foregoing data processing methods.

An embodiment of the present disclosure also provides a computer-readable storage medium, which stores computer instructions, and the instructions, when executed by a processor, are used for:
  receiving a transaction starting request;
  determining a target transaction and a target storage module corresponding to the target transaction based on the transaction starting request;
  sending an execution instruction to the target storage module, the execution instruction including the target transaction to be executed;
  sending a commit instruction to the target storage module when the target storage module returns a message that the target transaction is executed successfully, the commit instruction including the target transaction to be committed and a commit timestamp of the target transaction.

An embodiment of the present disclosure also provides a computer-readable storage medium, which stores computer instructions, and the instructions, when executed by a processor, are used for:
  executing a target transaction according to an execution instruction after receiving the execution instruction, the execution instruction including the target transaction to be executed;
  returning a message that the target transaction is successfully executed to the computing module when the target transaction is successfully executed; and
  receiving a commit instruction, committing the target transaction according to the commit instruction, and generating a binary log according to a commit timestamp of the target transaction, the commit instruction including the target transaction to be committed and the commit timestamp of the target transaction.

An embodiment of the present disclosure also provides a computer-readable storage medium, which stores computer instructions, and the instructions, when executed by a processor, are used for:
  reading a memory sequence of each execution module;
  obtaining a commit timestamp of a respective target transaction in each binary log in the memory sequence;

ordering binary logs in the memory sequence according to the commit timestamp of the respective target transaction; and writing the ordered binary logs to a message queue.

The above are schematic solutions of three computer-readable storage media in this embodiment. It should be noted that the technical solutions of the storage media and the technical solutions of the foregoing data processing methods belong to the same concept, and specific contents that are not described in detail in the technical solutions of the storage media can be referenced to the descriptions of the technical solutions of the foregoing data processing methods.

The above describes specific embodiments of the present disclosure. Other implementations are within the scope of the appended claims. In some cases, actions or steps recited in the claims can be performed in an order different from those in the embodiments, and still achieve desirable results. In addition, the processes depicted in the accompanying figures do not necessarily require a particular order or a sequential order as shown to achieve desirable results. Multitasking and parallel processing are also possible or may be advantageous in certain embodiments.

The computer instructions include computer program codes. The computer program codes may be in a source code form, an object code form, an executable file or an intermediate form, etc. The computer readable medium may include: any entity or device capable of carrying computer program codes, a recording medium, an U disk, a removable hard disk, a magnetic disk, an optical disk, a computer storage device, a read-only memory (ROM), a random access memory (RAM), etc. It needs to be noted that the content included in the computer-readable medium may be appropriately increased or decreased according to the requirements of legislation and patent practice in the jurisdiction. For example, in some jurisdictions, a computer-readable medium excludes electrical carrier signals and telecommunication signals.

It needs to be noted that, for the sake of simplicity of description, the above-mentioned method embodiments are expressed as a series of action combinations. However, one skilled in the art should know that the present disclosure is not limited by the described orders of actions because according to the present disclosure, certain steps can be performed in other orders or in parallel. Secondly, one skilled in the art should also know that the embodiments described in the present disclosure are all exemplary embodiments, and actions and modules involved therein may not be necessarily required by the present disclosure.

In the foregoing embodiments, the descriptions of each embodiment have their own emphases. For parts that are not described in detail in a certain embodiment, reference may be made to relevant descriptions of other embodiments.

The exemplary embodiments of the present disclosure disclosed above are only used for helping to explain the present disclosure. Optional embodiments do not exhaustively describe all the details, nor is the invention limited to specific implementations that are described. Apparently, a number of modifications and variations can be made based on the contents of the present disclosure. The present disclosure selects and in implementations describes these embodiments in order to better explain the principles and practical applications of the present disclosure, so that one skilled in the art can well understand and use the present disclosure. The present disclosure is to be limited only by the claims, along with their full scopes and equivalents.

The present disclosure can further be understood using the following clauses.

Clause 1: A distributed database system comprising: a computing module and a storage module, wherein: the computing module is configured to receive a transaction starting request; determine a target transaction and a target storage module corresponding to the target transaction based on the transaction starting request; send an execution instruction to the target storage module, and the execution instruction including the target transaction to be executed; send a commit instruction to the target storage module when the target storage module returns a message that the target transaction is executed successfully, the commit instruction including the target transaction to be committed and a commit timestamp of the target transaction; and the target storage module is configured to receive the execution instruction, and execute the target transaction according to the execution instruction; return the message that the target transaction is successfully executed to the computing module when the target transaction is successfully executed; and receive the commit instruction, commit the target transaction according to the commit instruction, and generate a binary log according to the commit timestamp of the target transaction.

Clause 2: The distributed database system of Clause 1, further comprising: a plurality of execution modules and an ordering module, each execution module in the plurality of execution modules corresponding to a storage module, wherein: the execution module is configured to read binary logs of a corresponding storage module, and generate a memory sequence according to the binary logs; and the ordering module is configured to read a respective memory sequence of each execution module, and obtain a commit timestamps of a target transaction in each binary log in the memory sequence; according to the commit timestamp of the target transaction, order the binary logs in the memory sequence; and write the ordered binary logs into a message queue.

Clause 3: The distributed database system of Clause 2, wherein the computing module is further configured to: determine an execution logic of a form processing event if the form processing event is detected; generate a timestamp of the form processing event according to the execution logic; and generate a binary log of the form processing event based on the timestamp.

Clause 4: The distributed database system of Clause 3, wherein the computing module is further configured to: determine an operation type of the form processing event; determine a compatibility type corresponding to the form processing event based on the operation type; and determine the execution logic of the form processing event based on the compatibility type.

Clause 5: The distributed database system of Clause 4, wherein the computing module is further configured to: if the operation type belongs to a first type, determine that the compatibility type corresponding to the form processing event is that a first version is compatible with a second version, the first version being a version before an execution of the form processing event, and the second version being a version after the execution of the form processing event; and if the operation type belongs to a second type, determine that the compatibility type corresponding to the form processing event is that the second version is compatible with the first version.

Clause 6: The distributed database system of Clause 5, wherein the computing module is further configured to: if the compatibility type corresponding to the form processing event is that the first version is compatible with the second version, determine that the execution logic of the form processing event is a post-order execution; and if the compatibility type corresponding to the form processing event is that the second version is compatible with the first version, determine that the execution logic of the form processing event is a pre-order execution.

Clause 7: The distributed database system of Clause 6, wherein the computing module is further configured to: if the execution logic of the form processing event is the pre-order execution, obtain the timestamp of the form processing event before binary logs corresponding to all data of the second version are generated; and if the execution logic of the form processing event is the post-order execution, obtain the timestamp of the form processing event after binary logs corresponding to all data of the first version are generated.

Clause 8: The distributed database system of Clause 3, wherein the ordering module is further configured to: insert the binary logs of the form processing event into the message queue according to the timestamp of the form processing event.

Clause 9: The distributed database system of Clause 1, wherein the system further comprises a timestamp generator, and the computing module is further configured to: apply to the timestamp generator for a globally ordered timestamp; and determine the timestamp as the commit timestamp of the target transaction.

Clause 10: The distributed database system of Clause 1, wherein the transaction starting request includes a transaction identification and a corresponding storage module identification, and the computing module is further configured to: determine a transaction indicated by the transaction identification as the target transaction; and determine a storage module indicated by the storage module identification as the corresponding target storage module.

Clause 11: The distributed database system of Clause 1, wherein the transaction starting request includes a transaction identification, and the computing module is further configured to: determine a transaction indicated by the transaction identification as the target transaction; and determine the target storage module corresponding to the target transaction according to a preset allocation rule.

Clause 12: The distributed database system of Clause 2, wherein the execution module is further configured to: return to perform the operation step of reading the binary logs of the storage module if determining that the storage module corresponding thereto generates a new binary log; and correspondingly, the ordering module is further configured to: return to perform the operation step of reading the memory sequence of each execution module; or obtain a binary log added in the execution module, and put the binary log at a tail of the message queue.

Clause 13: The distributed database system of Clause 11, wherein the computing module is further configured to: record a storage module identification of the target storage module.

Clause 14: The distributed database system of Clause 1, wherein the computing module is further configured to: send a target transaction starting request to the target storage module; and execute the operation step of sending the execution instruction to the target storage module when the target storage module returns a start message.

Clause 15: The distributed database system of Clause 1, wherein the storage module is further configured to: generate a binary log, and record the commit timestamp of the target transaction in a comment of the binary log.

Clause 16: A data processing method, which is applied to a computing module in a distributed database system, the method comprising: receiving a transaction starting request; determining a target transaction and a target storage module corresponding to the target transaction based on the transaction starting request; sending an execution instruction to the target storage module, the execution instruction including the target transaction to be executed; sending a commit instruction to the target storage module when the target storage module returns a message that the target transaction is executed successfully, the commit instruction including the target transaction to be committed and a commit timestamp of the target transaction.

Clause 17: The data processing method of Clause 16, further comprising: determining an execution logic of a form processing event if the form processing event is detected; generating a timestamp of the form processing event according to the execution logic; and generating a binary log of the form processing event based on the timestamp.

Clause 18: The data processing method of Clause 17, wherein determining the execution logic of the form processing event comprises: determining an operation type of the form processing event; determining a compatibility type corresponding to the form processing event according to the operation type; and determining the execution logic of the form processing event according to the compatibility type.

Clause 19: The data processing method of Clause 18, wherein determining the compatibility type corresponding to the form processing event according to the operation type comprises: if the operation type belongs to a first type, determine that the compatibility type corresponding to the form processing event is that a first version is compatible with a second version, the first version being a version before an execution of the form processing event, and the second version being a version after the execution of the form processing event; and if the operation type belongs to a second type, determine that the compatibility type corresponding to the form processing event is that the second version is compatible with the first version.

Clause 20: The data processing method of Clause 19, wherein determining the execution logic of the form processing event according to the compatibility type comprises: if the compatibility type corresponding to the form processing event is that the first version is compatible with the second version, determine that the execution logic of the form processing event is a post-order execution; if the compatibility type corresponding to the form processing event is that the second version is compatible with the first version, determine that the execution logic of the form processing event is a pre-order execution.

Clause 21: The data processing method of Clause 20, wherein generating the timestamp of the form processing event according to the execution logic comprises: if the execution logic of the form processing event is the pre-order execution, obtain the timestamp of the form processing event before binary logs corresponding to all data of the second version are generated; and if the execution logic of the form processing event is the post-order execution, obtain the timestamp of the form processing event after binary logs corresponding to all data of the first version are generated.

Clause 22: The data processing method of Clause 16, wherein before sending the commit instruction to the target storage module, the method further comprises: applying to a timestamp generator for a globally ordered timestamp; and determining the timestamp as the commit timestamp of the target transaction.

Clause 23: The data processing method of Clause 16, wherein the transaction starting request includes a transaction identification and a corresponding storage module identification, and determining the target transaction and the target storage module corresponding to the target transaction based on the transaction starting request includes: determining a transaction indicated by the transaction identification as the target transaction; and determining a storage module indicated by the storage module identification as the corresponding target storage module.

Clause 24: The data processing method of Clause 16, wherein the transaction starting request includes a transaction identification, and determining the target transaction and the target storage module corresponding to the target transaction based on the transaction starting request includes: determining a transaction indicated by the transaction identification as the target transaction; and determining a target storage module corresponding to the target transaction according to a preset allocation rule.

Clause 25: The data processing method of Clause 24, wherein: after sending the execution instruction to the target storage module, the method further includes: recording a storage module identification of the target storage module.

Clause 26: The data processing method of Clause 16, wherein: after determining the target transaction and the target storage module corresponding to the target transaction based on the transaction starting request, and before sending the execution instruction to the target storage module, the method further includes: sending a target transaction starting request to the target storage module; and executing the operation step of sending the execution instruction to the target storage module when the target storage module returns a start message.

Clause 27: A data processing method, which is applied to a storage module in a distributed database system, the method comprising: after receiving an execution instruction, executing a target transaction according to the execution instruction, the execution instruction including a target transaction to be executed; when the target transaction is executed successfully, returning a message that the target transaction is successfully executed to a computing module; and receiving a commit instruction, committing the target transaction according to the commit instruction, and generating a binary log according to a commit timestamp of the target transaction, the commit instruction including the target transaction to be committed and the commit timestamp of the target transaction.

Clause 28: The data processing method of Clause 27, wherein generating the binary log according to the commit timestamp of the target transaction comprises: generating a binary log, and recording the commit timestamp of the target transaction in a comment of the binary log.

Clause 29: A data processing method, which is applied to an ordering module in a distributed database system, the method comprising: reading a memory sequence of each execution module; obtaining commit timestamps of target transactions in each binary log in the memory sequence; ordering binary logs in the memory sequence according to the commit timestamps of the target transactions; and writing the ordered binary logs into a message queue.

Clause 30: The data processing method of Clause 29, wherein after writing the ordered binary log into the message queue, the method further comprises: if detecting that the memory sequence of the execution module changes, returning to the operation step of reading the memory sequence of each execution module.

Clause 31: The data processing method of Clause 29, wherein: after writing the ordered binary log into the message queue, the method further comprises: if detecting that the memory sequence of the execution module changes, obtaining a binary log added in the execution module, and placing the binary log into a tail of the message queue.

Clause 32: The data processing method of Clause 29, wherein: after writing the ordered binary log into the message queue, the method further comprises: inserting a binary log of a form processing event into the message queue according to a timestamp of the form processing event.

Clause 33: A computing device comprising: a memory; and a processor, wherein: the memory is configured to store computer-executable instructions, and the processor is configured to execute the computer-executable instructions: receiving a transaction starting request; determining a target transaction and a target storage module corresponding to the target transaction according to the transaction starting request; sending an execution instruction to the target storage module, the execution instruction including a target transaction to be executed; and when the target storage module returns a message that the target transaction is executed successfully, sending a commit instruction to the target storage module, the commit instruction including a target transaction to be committed and a commit timestamp of the target transaction.

Clause 34: A computing device comprising: a memory; and a processor, wherein: the memory is configured to store computer-executable instructions, and the processor is configured to execute the computer-executable instructions: after receiving an execution instruction, executing a target transaction according to the execution instruction, the execution instruction including a target transaction to be executed; when the target transaction is executed successfully, returning a message that the target transaction is successfully executed to a computing module; and receiving a commit instruction, committing the target transaction according to the commit instruction, and generating a binary log according to a commit timestamp of the target transaction, the commit instruction including the target transaction to be committed and the commit timestamp of the target transaction.

Clause 35: A computing device comprising: a memory; and a processor, wherein: the memory is configured to store computer-executable instructions, and the processor is configured to execute the computer-executable instructions: reading a memory sequence of each execution module; obtaining commit timestamps of target transactions in each binary log in the memory sequence; ordering binary logs in the memory sequence according to the commit timestamps of the target transactions; and writing the ordered binary logs into a message queue.

Clause 36: A computer-readable storage medium storing computer-executable instructions, wherein the instructions, when executed by a processor, implement the steps of the data processing method of any one of Clauses 16-26.

Clause 37: A computer-readable storage medium storing computer-executable instructions, wherein the instructions, when executed by a processor, implement the steps of the data processing method of any one of Clauses 27-28.

Clause 38: A computer-readable storage medium storing computer-executable instructions, wherein the instructions, when executed by a processor, implement the steps of the data processing method of any one of Clauses 29-32.

What is claimed is:

1. A method implemented by a computing module and used in a distributed database system based on database sharding, the method comprising:
receiving a transaction starting request;
determining a target transaction of a plurality of target transactions and a target storage module corresponding to the target transaction based on the transaction starting request, the plurality of target transactions to be executed by different storage modules in the distributed database system, and the different storage modules being single-chip databases and including the target storage module;
sending an execution instruction to the target storage module, the execution instruction including the target transaction that is to be executed; and
sending a commit instruction to the target storage module when the target storage module returns a message that the target transaction is executed successfully, wherein:
the commit instruction includes the target transaction that is to be committed and a commit timestamp of the target transaction, the commit timestamp being a globally ordered timestamp generated by a timestamp generator that is different from the computing module that sends the execution instruction and the commit instruction and the target storage module that executes the target transaction,
the commit instruction causes the target storage module to generate a new binary log for the target transaction after the target transaction is committed,
the new binary log includes the commit timestamp of the target transaction,
a plurality of different versions of data associated with at least one target transaction of the plurality of target transactions exists in the different storage modules, the plurality of different versions including a first version being a version before an execution of a data definition language (DDL) event and a second version being a version after the execution of the DDL event, and
the commit timestamp included in the new binary log is used for ordering binary logs that are generated for the plurality of target transactions and stored across the different storage modules, to ensure a downstream system to correctly accept the plurality of different versions of data associated with the at least one target transaction.

2. The method of claim 1, further comprising:
determining an execution logic of a form processing event if the form processing event is detected;
generating a timestamp of the form processing event according to the execution logic; and
generating a binary log of the form processing event based on the timestamp.

3. The method of claim 2, wherein determining the execution logic of the form processing event comprises:
determining an operation type of the form processing event;
determining a compatibility type corresponding to the form processing event according to the operation type; and
determining the execution logic of the form processing event according to the compatibility type.

4. The method of claim 3, wherein determining the compatibility type corresponding to the form processing event according to the operation type comprises:
if the operation type belongs to a first type, determining that the compatibility type corresponding to the form processing event is that a first version is compatible with a second version, the first version being a version before an execution of the form processing event, and the second version being a version after the execution of the form processing event; and
if the operation type belongs to a second type, determining that the compatibility type corresponding to the form processing event is that the second version is compatible with the first version.

5. The method of claim 4, wherein determining the execution logic of the form processing event according to the compatibility type comprises:
if the compatibility type corresponding to the form processing event is that the first version is compatible with the second version, determining that the execution logic of the form processing event is a post-order execution;
if the compatibility type corresponding to the form processing event is that the second version is compatible with the first version, determining that the execution logic of the form processing event is a pre-order execution.

6. The method of claim 4, wherein generating the timestamp of the form processing event according to the execution logic comprises:
if the execution logic of the form processing event is a pre-order execution, obtaining the timestamp of the form processing event before binary logs corresponding to all data of the second version are generated; and
if the execution logic of the form processing event is a post-order execution, obtaining the timestamp of the form processing event after binary logs corresponding to all data of the first version are generated.

7. The method of claim 1, wherein before sending the commit instruction to the target storage module, the method further comprises:
applying to the timestamp generator for the globally ordered timestamp.

8. The method of claim 1, wherein the transaction starting request includes a transaction identification and a corresponding storage module identification, and determining the target transaction of the plurality of target transactions and the target storage module corresponding to the target transaction based on the transaction starting request includes:
determining a transaction indicated by the transaction identification as the target transaction; and
determining a storage module indicated by the corresponding storage module identification as the target storage module.

9. The method of claim 1, wherein the transaction starting request includes a transaction identification, and determining the target transaction of the plurality of target transactions and the target storage module corresponding to the target transaction based on the transaction starting request includes:
determining a transaction indicated by the transaction identification as the target transaction; and
determining a target storage module corresponding to the target transaction according to a preset allocation rule.

10. The method of claim 9, wherein the preset allocation rule comprises a load balancing rule or a storage module performance rule.

11. The method of claim 9, wherein: after sending the execution instruction to the target storage module, the method further includes:

recording a storage module identification of the target storage module.

12. The method of claim 1, wherein: after determining the target transaction of the plurality of target transactions and the target storage module corresponding to the target transaction based on the transaction starting request, and before sending the execution instruction to the target storage module, the method further includes:
sending a target transaction starting request to the target storage module; and
sending the execution instruction to the target storage module when the target storage module returns a start message.

13. One or more computer readable media storing executable instructions that, when executed by one or more processors of a target storage module, cause the one or more processors to perform acts comprising:
executing a target transaction of a plurality of target transactions according to an execution instruction after receiving the execution instruction from a computing module, the plurality of target transactions to be executed by different storage modules in a distributed database system, and the different storage modules being single-chip databases and including the target storage module;
returning a message that the target transaction is successfully executed to the computing module when the target transaction is executed successfully; and
receiving a commit instruction, committing the target transaction according to the commit instruction, and generating a binary log according to a commit timestamp of the target transaction, wherein:
the commit instruction includes the target transaction that is to be committed and the commit timestamp of the target transaction, the commit timestamp being a globally ordered timestamp generated by a timestamp generator that is different from the computing module that sends the execution instruction and the commit instruction and the target storage module that executes the target transaction,
the commit instruction causes the target storage module to generate a new binary log for the target transaction after the target transaction is committed,
the new binary log includes the commit timestamp of the target transaction,
a plurality of different versions of data associated with at least one target transaction of the plurality of target transactions exists in the different storage modules, the plurality of different versions including a first version being a version before an execution of a data definition language (DDL) event and a second version being a version after the execution of the DDL event, and
the commit timestamp included in the new binary log is used for ordering binary logs that are generated for multiple target transactions and stored across the different storage modules, to ensure a downstream system to correctly accept the plurality of different versions of data associated with the at least one target transaction.

14. The one or more computer readable media of claim 13, wherein the execution instruction includes the target transaction.

15. The one or more computer readable media of claim 13, wherein generating the binary log according to the commit timestamp of the target transaction comprises:
generating a binary log, and recording the commit timestamp of the target transaction in a comment of the binary log.

16. A system used in a distributed database based on database sharding, the system comprising:
one or more processors; and
memory storing executable instructions that, when executed by the one or more processors, cause the one or more processors to perform acts comprising:
reading different memory sequences of a plurality of executable modules;
obtaining commit timestamps of target transactions in binary logs in the different memory sequences of the plurality of executable modules, one binary log corresponding to one target transaction, wherein the commit timestamps are globally ordered timestamps generated by a timestamp generator that is different from a computing module that sends execution instructions and commit instructions and target storage modules that execute the target transactions;
ordering the binary logs in the different memory sequences according to the commit timestamps of the target transactions; and
writing the ordered binary logs into a message queue, wherein:
a plurality of different versions of data associated with at least one target transaction of the target transactions exists in the plurality of executable modules, the plurality of different versions including a first version being a version before an execution of a data definition language (DDL) event and a second version being a version after the execution of the DDL event, and
the ordered binary logs are used to ensure a downstream system to correctly accept the plurality of different versions of data associated with the at least one target transaction.

17. The system of claim 16, wherein after writing the ordered binary logs into the message queue, the acts further comprise:
if detecting that the memory sequence of the execution module changes, returning to read the different memory sequences of the plurality of executable modules.

18. The system of claim 16, wherein the acts further comprise: detecting that at least one of the different memory sequences changes by detecting a new binary log generated for a new transaction.

19. The system of claim 16, wherein: after writing the ordered binary logs into the message queue, the acts further comprise:
if detecting that at least one of the different memory sequences changes, obtaining a binary log added in an execution module associated with the at least one of the different memory sequences, and placing the binary log into a tail of the message queue.

20. The system of claim 16, wherein: after writing the ordered binary logs into the message queue, the acts further comprise:
inserting a binary log of a form processing event into the message queue according to a timestamp of the form processing event.

* * * * *